United States Patent
Li et al.

(10) Patent No.: US 10,206,224 B2
(45) Date of Patent: Feb. 12, 2019

(54) METHOD AND DEVICE FOR MAINTAINING SERVICE CONTINUITY

(71) Applicant: Huawei Technologies Co., Ltd., Shenzhen (CN)

(72) Inventors: Bingzhao Li, Beijing (CN); Zhenxing Hu, Shenzhen (CN); Yongqiang Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 173 days.

(21) Appl. No.: 15/194,116

(22) Filed: Jun. 27, 2016

(65) Prior Publication Data
US 2016/0309522 A1    Oct. 20, 2016

Related U.S. Application Data

(63) Continuation of application No. PCT/CN2014/071599, filed on Jan. 27, 2014.

(30) Foreign Application Priority Data

Dec. 27, 2013  (WO) ................ PCT/CN2013/090767

(51) Int. Cl.
*H04W 72/12* (2009.01)
*H04W 4/06* (2009.01)
(Continued)

(52) U.S. Cl.
CPC ......... *H04W 72/1289* (2013.01); *H04W 4/06* (2013.01); *H04W 76/30* (2018.02); *H04W 76/40* (2018.02); *H04W 84/042* (2013.01)

(58) Field of Classification Search
CPC ... H04W 72/1289; H04W 4/06; H04W 76/30; H04W 84/042
See application file for complete search history.

(56) References Cited

U.S. PATENT DOCUMENTS

2010/0189027 A1*  7/2010  Ishida .................. H04W 48/12
                                                       370/312
2011/0274028 A1   11/2011  Terry
(Continued)

FOREIGN PATENT DOCUMENTS

CN        102256210 A    11/2011
CN        102651852 A     8/2012
(Continued)

OTHER PUBLICATIONS

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300, V10.11.0, pp. 1-196, 3$^{rd}$ Generation Partnership Project, Valbonne, France (Sep. 2013).
(Continued)

*Primary Examiner* — Ajay Cattungal
(74) *Attorney, Agent, or Firm* — Leydig, Voit & Mayer, Ltd.

(57) ABSTRACT

The present invention discloses a method and device for maintaining service continuity. The method for maintaining service continuity includes: receiving, by a base station, a first notification, which is sent by an MCE, for stopping scheduling of an MBMS service; and notifying, by the base station, user equipment of MBMS service scheduling stop information, and continuing to schedule the MBMS service. In this way, a service interruption time that is caused when UE receives a service after an MCE stops scheduling of the service can be effectively reduced.

14 Claims, 8 Drawing Sheets

A base station receives a first notification, which is sent by a multi-cell/multicast coordination entity, for stopping scheduling of an MBMS service — S101

The base station notifies user equipment of MBMS service scheduling stop information, and continues to schedule the MBMS service — S102

(51) Int. Cl.
*H04W 76/40* (2018.01)
*H04W 76/30* (2018.01)
*H04W 84/04* (2009.01)

(56) References Cited

U.S. PATENT DOCUMENTS

| | | | |
|---|---|---|---|
| 2013/0055318 A1* | 2/2013 | Wang | H04W 72/005 725/62 |
| 2013/0094428 A1 | 4/2013 | Lee | |
| 2013/0155871 A1* | 6/2013 | Zhu | H04W 4/06 370/241.1 |
| 2013/0215761 A1* | 8/2013 | Xu | H04W 24/08 370/241 |
| 2013/0286927 A1* | 10/2013 | Jiao | H04B 7/155 370/312 |
| 2013/0294320 A1 | 11/2013 | Jactat et al. | |
| 2014/0071878 A1 | 3/2014 | Xu et al. | |
| 2014/0140260 A1* | 5/2014 | Wang | H04W 4/06 370/312 |
| 2016/0249183 A1* | 8/2016 | Kim | H04W 4/06 |

FOREIGN PATENT DOCUMENTS

| | | |
|---|---|---|
| CN | 102724636 A | 10/2012 |
| CN | 102740234 A | 10/2012 |
| CN | 102790948 A | 11/2012 |
| CN | 103026642 A | 4/2013 |
| CN | 103202040 A | 7/2013 |
| JP | 2005535257 A | 11/2005 |
| JP | 2013526815 A | 6/2013 |
| JP | 2013536646 A | 9/2013 |

OTHER PUBLICATIONS

"Introduction of MCE initiated MBMS Session Start Request," 3GPP TSG-RAN WG2 Meeting #72, Jacksonville, Florida, R2-106952, $3^{rd}$ Generation Partnership Project, Valbonne, France (Nov. 15-19, 2010).

"$3^{rd}$ Generation Partnership Project; Technical Specification Group Radio Access Network; Evolved Universal Terrestrial Radio Access (E-UTRA); Medium Access Control (MAC) protocol specification (Release 11)," 3GPP TS 36.321, V11.3.0, pp. 1-57, $3^{rd}$ Generation Project, Valbonne, France (Jun. 2013).

"$3^{rd}$ Generation Partnership Project; Technical Specification Group Radio Access Network; Evolved Universal Terrestrial Radio Access Network (E-UTRAN); M2 Application Protocol (M2AP) (Release 11)," 3GPP TS 36.443, V11.3.0, pp. 1-84, $3^{rd}$ Generation Partnership Project, Valbonne, France (Jun. 2013).

* cited by examiner

METHOD AND DEVICE FOR MAINTAINING SERVICE CONTINUITY

CROSS-REFERENCE TO RELATED APPLICATIONS

This application is a continuation of International Application No. PCT/CN2014/071599, filed on Jan. 27, 2014, which claims priority to International Patent Application No. PCT/CN2013/090767, filed on Dec. 27, 2013, both of which are hereby incorporated by reference in their entireties.

TECHNICAL FIELD

The present invention relates to the communications field, and in particular, to a method and device for maintaining service continuity.

BACKGROUND

A multimedia broadcast multicast service (MBMS) is a technology for simultaneously sending a same service to multiple user equipments (UE) by using a broadcast channel, and a group of UEs that receive a same service receive the service by using a same downlink configuration, and it is not necessary to establish a link for each UE.

A multimedia broadcast multicast service single frequency network (MBSFN) is a transmission manner in which synchronous transmission is performed in multiple cells at a same frequency at a same time, and frequency resources can be effectively reduced, spectrum utilization can be improved, and coverage can be improved by using the transmission manner.

A multi-cell/multicast coordination entity (MCE) is a logic entity, multiple MBSFN areas used for MBSFN transmission may be configured, and a radio resource is allocated to all evolved NodeBs (eNB) in an MBSFN area for MBSFN transmission.

The MCE instructs, in a statistical manner, to perform statistics on UEs that receive a service, and when a quantity of the UEs that receive a service is less than a particular quantity, the MCE may determine to suspend MBSFN transmission of the service. A specific implementation process is as follows: The MCE determines to suspend MBSFN transmission of a service, and updates a configuration of an eNB by using MBMS scheduling information, where information about the service is no longer carried in a new configuration; the eNB instructs UE to update a service configuration, where the information about the service is no longer carried in a new service configuration; after receiving the updated service configuration, if the UE finds that the information about the service is not in new configuration information, the UE considers that the service is stopped; and if the UE expects to continue to receive the service, the UE needs to trigger establishment of a unicast service again, and continues to receive the MBMS service by using the unicast service.

As can be known, if an MCE suspends MBSFN transmission of an MBMS service, after detecting that MBSFN transmission of the service is suspended, UE needs to establish a unicast bearer to continue to receive the MBMS service. The MBMS service cannot continue to be received until the unicast bearer is established completely. Because it needs to take a period of time to establish the unicast bearer, receiving the service by the UE is interrupted in this period of time.

SUMMARY

After an MCE determines to stop scheduling of a service, UE that needs to continue to receive the service needs to establish a unicast bearer. A technical problem to be mainly resolved by this application is how to reduce a service interruption time caused in a process of establishing the unicast bearer.

In view of this, this application provides a method and device for maintaining service continuity, which can effectively reduce a service interruption time that is caused when UE receives a service after an MCE stops scheduling of a service.

According to a first aspect, this application provides a method for maintaining service continuity, including: receiving, by a base station, a first notification, which is sent by a multi-cell/multicast coordination entity, for stopping scheduling of a multimedia broadcast multicast service MBMS service, where the first notification for stopping scheduling of the MBMS service is a notification that is sent by the multi-cell/multicast coordination entity to the base station when the multi-cell/multicast coordination entity determines to suspend the MBMS service; sending, by the base station, MBMS service scheduling stop information to user equipment according to the first notification for stopping scheduling of the MBMS service; and continuing to schedule, by the base station, the MBMS service until a predetermined condition is met, and then, stopping scheduling the MBMS service.

With reference to the first aspect, in a first possible implementation manner of the first aspect, the first notification for stopping scheduling of the MBMS service carries a stop delaying indication, to instruct the base station to delay stopping scheduling the MBMS service.

With reference to the first aspect or the first possible implementation manner of the first aspect, in a second possible implementation manner of the first aspect, the predetermined condition is one of the following conditions: a second notification, which is sent by the multi-cell/multicast coordination entity, for stopping scheduling of the MBMS service is received, where the second notification for stopping scheduling of the MBMS service indicates that the base station stops scheduling the MBMS service; or after the first notification for stopping scheduling of the MBMS service is received, a time point indicated by the first notification for stopping scheduling of the MBMS service arrives; or after the first notification for stopping scheduling of the MBMS service is received, a first predetermined time passes; or after the first notification for stopping scheduling of the MBMS service is received, a second predetermined time point arrives.

With reference to the first possible implementation manner of the first aspect, in a third possible implementation manner of the first aspect, the first notification for stopping scheduling of the MBMS service includes the stop delaying time length information or predetermined stop timestamp information.

With reference to any one of the first aspect and the first to the third possible implementation manners of the first aspect, in a fourth possible implementation manner of the first aspect, the first notification for stopping scheduling of the MBMS service indicates that scheduling of the MBMS service will be stopped when the predetermined condition is met.

With reference to any one of the first aspect and the first to the fourth possible implementation manners of the first aspect, in a fifth possible implementation manner of the first aspect, the base station sends the MBMS service scheduling stop information to the user equipment by using a point to multipoint control channel message not carrying configuration information of the MBMS service.

With reference to the fifth possible implementation manner of the first aspect, in a sixth possible implementation manner of the first aspect, at the same time when or after the base station notifies the user equipment of the service scheduling stop information, the base station sends the stop delaying indication, to notify the user equipment that stopping scheduling of the MBMS service will be delayed.

With reference to any one of the first aspect and the first to the fourth possible implementation manners of the first aspect, in a seventh possible implementation manner of the first aspect, the MBMS service scheduling stop information carries an indication indicating that scheduling is to be stopped, to notify the user equipment that scheduling of the MBMS service is to be stopped, and the user equipment continues to receive the MBMS service until an MBMS service scheduling stop notification is received.

With reference to the sixth or the seventh possible implementation manner of the first aspect, in an eighth possible implementation manner of the first aspect, the base station sends, by using any one of a point to multipoint control channel, a paging control channel, and MBMS transmission channel scheduling information, the stop delaying indication.

According to a second aspect, this application provides a method for maintaining service continuity, where the method includes: receiving, by user equipment, MBMS service scheduling stop information from a base station, and determining that the base station is to stop scheduling the MBMS service; continuing to listen to, by the user equipment, scheduling information of the MBMS service; and receiving the MBMS service according to the scheduling information of the MBMS service.

With reference to the second aspect, in a first possible implementation manner of the second aspect, if the scheduling information of the MBMS service no longer includes configuration information of the MBMS service, receiving the MBMS service is stopped.

With reference to the second aspect or the first possible implementation manner of the second aspect, in a second possible implementation manner of the second aspect, the step of receiving, by user equipment, MBMS service scheduling stop information from a base station includes: receiving, by the user equipment, a point to multipoint control channel message, and determining, according to that the message does not carry the configuration information of the MBMS service, that the base station is to stop scheduling the MBMS service.

With reference to the second aspect, in a third possible implementation manner of the second aspect, the MBMS service scheduling stop information carries an indication indicating that the MBMS service is to be stopped, used to indicate, to the user equipment, that scheduling of the MBMS is to be stopped, and the user equipment continues to listen to the scheduling information of the MBMS service according to the stop delaying indication, until an MBMS service scheduling stop notification is received.

With reference to the second aspect, in a fourth possible implementation manner of the second aspect, at the same time when or after the user equipment receives the service scheduling stop information, the user equipment receives an MBMS service stop delaying indication from the base station, and continues to listen to the scheduling information of the MBMS service according to the MBMS service stop delaying indication.

With reference to the third or the fourth possible implementation manner of the second aspect, in a fifth possible implementation manner of the second aspect, the stop delaying indication is received by using any one of a point to multipoint control channel, a paging control channel, and MBMS transmission channel scheduling information.

With reference to the second aspect, in a sixth possible implementation manner of the second aspect, in a seventh possible implementation manner of the second aspect, the method further includes: determining, by the user equipment, that scheduling of the MBMS service is to be stopped; if the user equipment needs to continue to receive the MBMS service after the base station stops scheduling the MBMS service, triggering establishment of a unicast bearer; and after the unicast bearer is established completely, stopping receiving the MBMS service by using a point to multipoint traffic channel corresponding to the MBMS service, where a process of triggering establishment of the unicast bearer includes: sending, by an access layer of the user equipment to a higher layer of the user equipment, an indication indicating that the MBMS service cannot continue to be received; sending, by the higher layer of the user equipment to an application server, the indication indicating that the MBMS service cannot continue to be received; sending, by the application server, a unicast bearer establishment trigger request to the user equipment; and triggering, by the user equipment, establishment of the unicast bearer according to the trigger request.

According to a third aspect, this application provides a method for maintaining service continuity, where the method includes: determining, by a multi-cell/multicast coordination entity, an MBMS service that needs to be suspended; and sending an MBMS service scheduling stop notification to a base station, where the MBMS service scheduling stop notification notifies the base station that when a predetermined condition is met, scheduling of the MBMS service will be stopped, and instructs the base station to continue to schedule the MBMS service.

With reference to the third aspect, in a first possible implementation manner of the third aspect, the MBMS service scheduling stop notification includes the time length information of a predetermined time for continuing to schedule, or predetermined stop timestamp information, or MBMS service stop indication information, to indicate that the base station will continue to schedule the MBMS service for a predetermined time.

With reference to the third aspect or the first possible implementation manner of the third aspect, in a second possible implementation manner of the third aspect, the step of determining, by a multi-cell/multicast coordination entity, an MBMS service that needs to be suspended includes: instructing, by the multi-cell/multicast coordination entity, the base station to perform statistics on user equipments that receive the MBMS service; and determining, according to a statistical response of the base station, a quantity of the user equipments of the MBMS service, and when the quantity of the user equipments that receive the MBMS service is less than a predetermined threshold, determining that the MBMS service needs to be suspended, or receiving, by the multi-cell/multicast coordination entity, request information, which is sent by an application server, for suspending the MBMS service.

With reference to any one of the third aspect and the first and the second possible implementation manners of the third aspect, in a third possible implementation manner of the third aspect, the step of sending an MBMS service scheduling stop notification to a base station includes: updating configuration information of the base station by using MBMS scheduling information, where the updated configuration information no longer carries configuration information of the MBMS service that needs to be suspended, and is used as the MBMS service scheduling stop notification sent to the base station.

According to a fourth aspect, this application provides a method for maintaining service continuity, where the method includes: receiving, by a group communication server, information that is reported by user equipment and that indicates that a group service is received by using a multimedia broadcast multicast service single frequency network MBSFN; receiving, by the group communication server from a multi-cell/multicast coordination entity, a notification for stopping transmission of the MBSFN used to receive the group service, and determining, by the group communication server according to the notification for stopping transmission of the MBSFN, that transmission of the MBSFN is to be stopped; and instructing, by the group communication server, the user equipment to establish a unicast bearer, so that the user equipment continues to receive the group service by using the unicast bearer after the MBSFN used to receive the group service is stopped.

With reference to the fourth aspect, in a first possible implementation manner of the fourth aspect, the notification for stopping transmission of the MBSFN includes information about a service whose scheduling is stopped, and the information about the service includes at least one of the MBSFN area information and an MBMS identifier.

With reference to the fourth aspect or the first possible implementation manner of the fourth aspect, in a second possible implementation manner of the fourth aspect, the method further includes: after the user equipment establishes the unicast bearer, instructing, by the group communication server, the multi-cell/multicast coordination entity to stop transmission of the MBSFN.

According to a fifth aspect, this application provides a method for maintaining service continuity, where the method includes: determining, by a multi-cell/multicast coordination entity, transmission of an MBSFN that needs to be stopped; and notifying a group communication server that transmission of the MBSFN is stopped, so that the group communication server instructs the user equipment to establish a unicast bearer, and after transmission of the MBSFN is stopped, the user equipment continues to receive the group service by using the unicast bearer in replacement of the MBSFN.

With reference to the fifth aspect, in a first possible implementation manner of the fifth aspect, the step of determining, by a multi-cell/multicast coordination entity, transmission of an MBSFN that needs to be stopped includes: instructing, by the multi-cell/multicast coordination entity, a base station to perform statistics on user equipments that receive the MBMS service; and determining, according to a statistical response of the base station, a quantity of the user equipments of the MBMS service, and when the quantity of the user equipments that receive the MBMS service is less than a predetermined threshold, determining that an MBSFN transmission manner of the MBMS service needs to be stopped.

With reference to the fifth aspect or the first possible implementation manner of the fifth aspect, in a second possible implementation manner of the fifth aspect, the notification indicating that transmission of the MBSFN is to be stopped includes information about a service whose scheduling is stopped, and the information about the service includes at least one of the MBSFN area information and an MBMS identifier.

According to a sixth aspect, this application provides a method for maintaining service continuity, where the method includes: reporting, by user equipment to a group communication server, information indicating that a group service is received by using a multimedia broadcast multicast service single frequency network MBSFN; and establishing a unicast bearer according to a unicast bearer establishment notification of the group communication server, and continuing to listen to scheduling information of the carried group service.

With reference to the sixth aspect, in a first possible implementation manner of the sixth aspect, information about the group service includes at least one of the MBSFN area information and an MBMS identifier.

With reference to the sixth aspect or the first possible implementation manner of the sixth aspect, in a second possible implementation manner of the sixth aspect, before the step of reporting, by user equipment to a group communication server, information indicating that a group service is received by using an MBSFN, the method further includes: registering, by the user equipment, with the group communication server.

With reference to any one of the sixth aspect and the first and the second possible implementation manners of the sixth aspect, in a third possible implementation manner of the sixth aspect, the method further includes: after the unicast bearer is established completely, stopping, by the user equipment, listening to the scheduling information of the carried group service.

According to a seventh aspect, a base station is provided, where the base station includes a receiving module and a scheduling module, where the receiving module is configured to receive a first notification, which is sent by a multi-cell/multicast coordination entity, for stopping scheduling of a multimedia broadcast multicast service MBMS service, where the first notification for stopping scheduling of the MBMS service is a notification that is sent by the multi-cell/multicast coordination entity to the base station when the multi-cell/multicast coordination entity determines to suspend the MBMS service; and the scheduling module is configured to: after the receiving module receives the first notification for stopping scheduling of the MBMS service, send MBMS service scheduling stop information to user equipment, and continue to schedule the MBMS service until a predetermined condition is met, and then, stop scheduling the MBMS service.

With reference to the seventh aspect, in a first possible implementation manner of the seventh aspect, the first notification for stopping scheduling of the MBMS service carries a stop delaying indication, to instruct the base station to delay stopping scheduling the MBMS service.

With reference to the first possible implementation manner of the seventh aspect, in a second possible implementation manner of the seventh aspect, when one of the following conditions is met, the scheduling module stops scheduling the MBMS service: the receiving module receives a second notification, which is sent by the multi-cell/multicast coordination entity, for stopping scheduling of the MBMS service, where the second notification for stopping scheduling of the MBMS service indicates that the base station stops scheduling the MBMS service; or; or after the receiving module receives the first notification for stopping scheduling of the MBMS service, a time point indicated by the first notification for stopping scheduling of the MBMS service arrives; or after the receiving module receives the first notification for stopping scheduling of the MBMS service, a first predetermined time passes.

With reference to the first possible implementation manner of the seventh aspect, in a third possible implementation manner of the seventh aspect, the first notification for stopping scheduling of the MBMS service includes the stop delaying time length information or predetermined stop timestamp information.

With reference to any one of the seventh aspect or the first to the third possible implementation manners of the seventh aspect, in a fourth possible implementation manner of the seventh aspect, the first notification for stopping scheduling of the MBMS service indicates that scheduling of the MBMS service will be stopped when the predetermined condition is met.

With reference to any one of the seventh aspect and the first to the fourth possible implementation manners of the seventh aspect, in a fifth possible implementation manner of the seventh aspect, the scheduling module sends the MBMS service scheduling stop information to the user equipment by using a point to multipoint control channel message not carrying configuration information of the MBMS service.

With reference to the fifth possible implementation manner of the seventh aspect, in a sixth possible implementation manner of the seventh aspect, at the same time when or after the scheduling module notifies the user equipment of the service scheduling stop information, the scheduling module sends a stop delaying indication, to notify the user equipment that stopping scheduling of the MBMS service will be delayed.

With reference to any one of the seventh aspect and the first to the fifth possible implementation manners of the seventh aspect, in a seventh possible implementation manner of the seventh aspect, the MBMS service scheduling stop information carries an indication indicating that the MBMS service is to be stopped, to notify the user equipment that scheduling of the MBMS service is to be stopped.

With reference to the sixth or the seventh possible implementation manner of the seventh aspect, in an eighth possible implementation manner of the seventh aspect, the scheduling module sends, by using any one of a point to multipoint control channel, a paging control channel, and MBMS transmission channel scheduling information, the stop delaying indication.

According to an eighth aspect, user equipment is provided, where the user equipment includes a first receiving module, a listening module, and a second receiving module, where the first receiving module is configured to receive MBMS service scheduling stop information from a base station, and determine that the MBMS service is to be stopped; the listening module is configured to continue to listen to scheduling information of the MBMS service; and the second receiving module is configured to receive the MBMS service according to the scheduling information of the MBMS service that is listened to and obtained by the listening module.

With reference to the eighth aspect, in a first possible implementation manner of the eighth aspect, if the scheduling information of the MBMS service no longer includes configuration information of the MBMS service, the second receiving module stops receiving the MBMS service.

With reference to the eighth aspect or the first possible implementation manner of the eighth aspect, in a second possible implementation manner of the eighth aspect, the first receiving module is configured to receive a point to multipoint control channel message, and determine, according to that the message does not carry the configuration information of the MBMS service, that the base station is to stop scheduling the MBMS service.

With reference to the eighth aspect, in a third possible implementation manner of the eighth aspect, the MBMS service scheduling stop information carries an indication indicating that scheduling of the MBMS service is to be stopped and used to indicate, to the user equipment, that scheduling of the MBMS service is to be stopped, and the listening module is configured to continue to listen to the scheduling information of the MBMS service according to the indication indicating that scheduling of the MBMS service is to be stopped, until MBMS service stop notification information is received.

With reference to the eighth aspect, in a fourth possible implementation manner of the eighth aspect, the first receiving module is configured to: at the same time when or after receiving the service scheduling stop information, receive an MBMS service stop delaying indication from the base station, and the listening module is configured to continue to listen to the scheduling information of the MBMS service according to the MBMS service stop delaying indication.

With reference to the third or the fourth possible implementation manner of the eighth aspect, in a fifth possible implementation manner of the eighth aspect, the first receiving module receives, by using any one of a point to multipoint control channel, a paging control channel, and MBMS transmission channel scheduling information, the stop delaying indication.

With reference to the eighth aspect, in a sixth possible implementation manner of the eighth aspect, the user equipment further includes a unicast establishment module, where the unicast establishment module is configured to: when the user equipment needs to continue to receive the MBMS service after the base station stops scheduling the MBMS service, trigger establishment of a unicast bearer; and after the unicast bearer is established completely, the second receiving module stops receiving the MBMS service by using a point to multipoint traffic channel corresponding to the MBMS service.

According to a ninth aspect, a multi-cell/multicast coordination entity is provided, where the multi-cell/multicast coordination entity includes a determining module and a scheduling module, where the determining module is configured to determine an MBMS service that needs to be suspended; and the scheduling module is configured to: after the determining module determines the MBMS service that needs to be suspended, send an MBMS service scheduling stop notification to a base station, where the MBMS service scheduling stop notification notifies the base station that scheduling of the MBMS service will be stopped when a predetermined condition is met, and the scheduling module instructs the base station to continue to schedule the MBMS service.

With reference to the ninth aspect, in a first possible implementation manner of the ninth aspect, the MBMS service scheduling stop notification includes the time length information of a predetermined time for continuing to schedule, or predetermined stop timestamp information, or indication information indicating that the MBMS service is to be stopped, to indicate that the base station will continue to schedule the MBMS service for a predetermined time.

With reference to the ninth aspect or the first possible implementation manner of the ninth aspect, in a second possible implementation manner of the ninth aspect, the determining module is configured to determine, by instructing the base station to perform statistics on user equipments that receive the MBMS service, according to a statistical response of the base station, a quantity of the user equipments of the MBMS service, and when the quantity of the user equipments that receive the MBMS service is less than a predetermined threshold, that an MBSFN transmission manner of the MBMS service needs to be suspended.

With reference to any one of the ninth aspect and the first and the second possible implementation manners of the ninth aspect, in a third possible implementation manner of the ninth aspect, the scheduling module updates configuration information of the base station by using MBMS scheduling information, where the updated configuration information no longer carries configuration information of the MBMS service that needs to be suspended, and is used as the MBMS service scheduling stop notification sent to the base station.

According to a tenth aspect, a base station is provided, where the base station includes a processor, a receiver, a transmitter, and a memory, where the processor is separately coupled to the receiver, the transmitter, and the memory; the processor is configured to control the receiver to receive a first notification, which is sent by a multi-cell/multicast coordination entity, for stopping scheduling of a multimedia broadcast multicast service MBMS service, where the first notification for stopping scheduling of the MBMS service is a notification that is sent by the multi-cell/multicast coordination entity to the base station when the multi-cell/multicast coordination entity determines to suspend the MBMS service; and after the first notification for stopping scheduling of the MBMS service is received, control the transmitter to send MBMS service scheduling stop information to user equipment; and the processor continues to schedule the MBMS service until a predetermined condition is met, and then stops scheduling the MBMS service; and the memory is configured to store the MBMS data.

According to an eleventh aspect, user equipment is provided, where the user equipment includes a processor, a receiver, and a memory, where the processor is separately coupled to the receiver and the memory; the processor is configured to control the receiver to receive MBMS service scheduling stop information from a base station; determine that the base station will stop, when a predetermined condition is met, scheduling the MBMS service; continue to listen to scheduling information of the MBMS service; and control the receiver to receive the MBMS service according to the scheduling information of the MBMS service that is listened to and obtained by the processor; and the memory is configured to store the MBMS service data.

According to a twelfth aspect, a multi-cell/multicast coordination entity is provided, where the multi-cell/multicast coordination entity includes a processor, a transmitter, and a memory, where the processor is separately coupled to the transmitter and the memory; the processor is configured to determine an MBMS service that needs to be suspended; and control the transmitter to send an MBMS service scheduling stop notification to a base station, where the MBMS service scheduling stop notification notifies the base station that when a predetermined condition is met, scheduling of the MBMS service will be stopped; and the processor instructs the base station to continue to schedule the MBMS service; and the memory is configured to store the MBMS service data.

According to a thirteenth aspect, a group communication server is provided, where the group communication server includes a first receiving module, a second receiving module, and a notification module, where the first receiving module is configured to receive information that is reported by user equipment and that indicates that a group service is received by using a multimedia broadcast multicast service single frequency network MBSFN; the second receiving module is configured to receive, from a multi-cell/multicast coordination entity, a notification for stopping transmission of the MBSFN used to receive the group service; and the notification module is configured to instruct the user equipment to establish a unicast bearer, so that the user equipment continues to receive the group service by using the unicast bearer after the MBSFN used to receive the group service is stopped.

With reference to the thirteenth aspect, in a first possible implementation manner of the thirteenth aspect, the notification for stopping transmission of the MBSFN includes information about a service whose scheduling is stopped, and the information about the service includes at least one of the MBSFN information and an MBMS identifier.

With reference to the thirteenth aspect or the first possible implementation manner of the thirteenth aspect, in a second possible implementation manner of the thirteenth aspect, the notification module is further configured to: after the user equipment establishes the unicast bearer, instruct the multi-cell/multicast coordination entity to stop transmission of the MBSFN.

According to a fourteenth aspect, a multi-cell/multicast coordination entity is provided, where the multi-cell/multicast coordination entity includes a determining module and a notification module, where the determining module is configured to determine transmission of an MBSFN that needs to be stopped; and the notification module is configured to: after the determining module determines transmission of the MBSFN that needs to be stopped, notify a group communication server that transmission of the MBSFN is stopped, so that the group communication server instructs the user equipment to establish a unicast bearer, and after transmission of the MBSFN is stopped, the user equipment continues to receive the group service by using the unicast bearer in replacement of the MBSFN.

With reference to the fourteenth aspect, in a first possible implementation manner of the fourteenth aspect, the determining module determines, by instructing a base station to perform statistics on user equipments of the MBMS service, according to a statistical response of the base station, a quantity of the user equipments of the MBMS service, and when the quantity of the user equipments that receive the MBMS service is less than a predetermined threshold, that an MBSFN transmission manner of the MBMS service needs to be stopped.

With reference to the fourteenth aspect or the first possible implementation manner of the fourteenth aspect, in a second possible implementation manner of the fourteenth aspect, the notification for stopping transmission of the MBSFN includes information about a service whose scheduling is stopped, and the information about the service includes at least one of the MBSFN information and an MBMS identifier.

According to a fifteenth aspect, user equipment is provided, where the user equipment includes a reporting module and a unicast bearer establishment module, where the reporting module is configured to report, to a group communication server, information indicating that a group service is received by using a multimedia broadcast multicast service single frequency network MBSFN; and the unicast bearer establishment module is configured to: when the group service needs to continue to be received after transmission of the MBSFN is stopped, establish a unicast bearer according to a notification for stopping transmission of the MBSFN, and continue to listen to scheduling information of the carried group service.

With reference to the fifteenth aspect, in a first possible implementation manner of the fifteenth aspect, the information about the group service includes at least one of the MBSFN information and an MBMS identifier.

With reference to the fifteenth aspect or the first possible implementation manner of the fifteenth aspect, in a second possible implementation manner of the fifteenth aspect, the reporting module is further configured to register with the group communication server.

With reference to any one of the fifteenth aspect and the first and the second possible implementation manners of the fifteenth aspect, in a third possible implementation manner of the fifteenth aspect, after the unicast bearer is established completely, the unicast bearer establishment module stops listening to the scheduling information of the carried group service.

According to a sixteenth aspect, a group communication server is provided, where the group communication server includes a processor, a receiver, and a memory, where the processor is separately coupled to the receiver and the memory; the processor is configured to control the receiver to receive information that is reported by user equipment and that indicates that a group service is received by using a multimedia broadcast multicast service single frequency network MBSFN; control the receiver to receive, from a multi-cell/multicast coordination entity, a notification for stopping transmission of the MBSFN used to receive the group service; and instruct the user equipment to establish a unicast bearer, so that the user equipment continues to receive the group service by using the unicast bearer after the MBSFN used to receive the group service is stopped; and the memory is configured to store data of the group service.

According to a seventeenth aspect, a multi-cell/multicast coordination entity is provided, where the multi-cell/multicast coordination entity includes a processor, a transmitter, and a memory, where the processor is separately coupled to the transmitter and the memory; the processor is configured to determine transmission of an MBSFN that needs to be stopped; control the transmitter to send a notification to a group communication server, to notify the group communication server that transmission of the MBSFN is stopped, so that the group communication server instructs the user equipment to establish a unicast bearer, and after transmission of the MBSFN is stopped, the user equipment continues to receive the group service by using the unicast bearer in replacement of the MBSFN; and the memory is configured to store data.

According to an eighteenth aspect, user equipment is provided, where the user equipment comprises a processor, a receiver, and a memory, where the processor is separately coupled to the receiver and the memory; the processor is configured to report, to a group communication server, information indicating that a group service is received by using a multimedia broadcast multicast service single frequency network MBSFN; control the receiver to receive a notification of the group communication server; and when the group service needs to continue to be received after transmission of the MBSFN is stopped, establish a unicast bearer according to a notification, of the group communication server, for stopping transmission of the MBSFN, and continue to listen to scheduling information of the carried group service; and the memory is configured to store data.

Compared with the prior art, beneficial effects of this application are as follows: According to the foregoing technical solutions, a base station receives an MBMS service scheduling stop notification sent by an MCE, and the base station sends notifies user equipment of MBMS service scheduling stop information, and continues to schedule the MBMS service. In this way, an MCE determines to stop scheduling of an MBMS service, and user equipment that needs to continue to receive the MBMS service can also continue to receive the service in a process of establishing a unicast bearer, thereby effectively reducing a service interruption time in the process of establishing the unicast bearer because the user equipment needs to continue to receive the service after scheduling of the service is stopped, and providing better use experience to a user.

DESCRIPTION OF EMBODIMENTS

Figure 1:
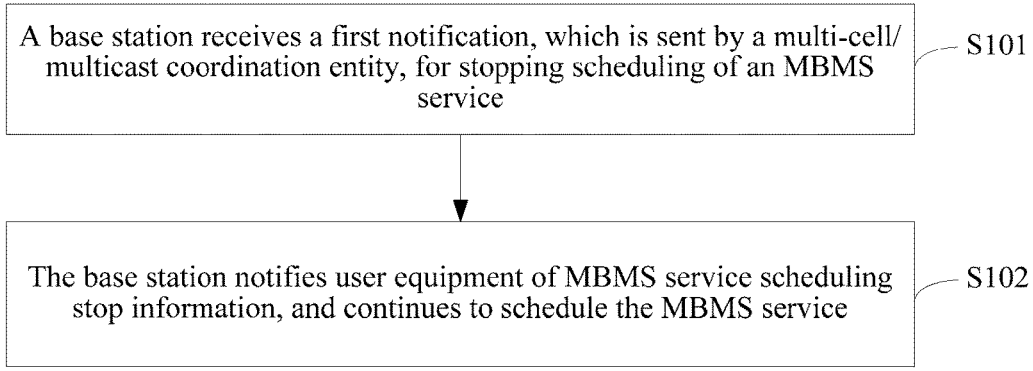
FIG. 1 is a flowchart of a first method for maintaining service continuity according to an embodiment of the present invention.

Referring to FIG. 1, FIG. 1 is a flowchart of a first method for maintaining service continuity according to an embodiment of the present invention. In this embodiment, a description is provided from the perspective of a base station, and the method for maintaining service continuity in this embodiment includes:

S101: A base station receives a first notification, which is sent by a multi-cell/multicast coordination entity, for stopping scheduling of an MBMS service.

A multi-cell/multicast coordination entity (MCE) first triggers a base station (eNB) to perform statistics on user equipments that receive an MBMS service, and determines, according to a statistical response of the eNB, a quantity of the user equipments of the MBMS service, and when the quantity of the user equipments that receive the MBMS service is less than a predetermined threshold, the MCE determines to stop scheduling of the MBMS service. The MCE instructs the eNB to stop scheduling the MBMS service, where the quantity of the user equipments that receive the MBMS service is less than the predetermined threshold, for example, stop scheduling a service 1.

The eNB receives a first notification, which is sent by the MCE, for stopping scheduling of an MBMS service. The first notification for stopping scheduling of the MBMS service is a notification that is sent by the MCE to the base station when the MCE determines to suspend the MBMS service, and the first notification for stopping scheduling of the MBMS service may be used to indicate that scheduling of an MBMS service will be stopped when a predetermined condition is met. The predetermined condition may be scheduling will be stopped after a particular time, at a fixed time point, or when a notification for stopping scheduling of the MBMS service is received again. Certainly, the predetermined condition may also be another specified condition.

Optionally, the first notification for stopping scheduling of the MBMS service may further carry a stop delaying indication, to instruct the eNB to delay stopping scheduling the MBMS service. Further, the first notification for stopping scheduling of the MBMS service may further include stop delaying time length information or stop timestamp information, used to instruct the eNB to stop scheduling the MBMS service after a specified time is delayed.

For example, if the MCE determines to stop scheduling of the service 1, the MCE sends, to the eNB, a first notification for stopping scheduling of the service 1, where the notification may be used to indicate that scheduling of the service 1 is to be stopped, or the first notification may carry a stop delaying indication, to instruct the eNB to delay stopping scheduling the service 1, and according to the MBMS service stop delaying indication, the eNB continues to schedule the service for a period of time and then, stops scheduling the service. A stop delaying time may be further specified, used to indicate a relative time of a scheduling stop time relative to the received first notification for stopping scheduling, for example, 10 minutes, 5 minutes, two modification cycles, or another piece of time information, or timestamp information may be specified, for example, 12:30, 12:40, or another piece of specific timestamp information.

Optionally, the first notification for stopping scheduling of the MBMS service is carried by using MBMS scheduling information, and when the MBMS scheduling information no longer carries configuration information of the MBMS service, it indicates that scheduling of the MBMS service is to be stopped.

S102: The base station sends MBMS service scheduling stop information to user equipment according to the first notification for stopping scheduling of the MBMS service.

After the eNB receives the first notification, of the MCE, for stopping scheduling of the MBMS service, the eNB sends the MBMS service scheduling stop information to the user equipment.

The eNB may send the MBMS service scheduling stop information to the user equipment by using a point to multipoint control channel message not carrying the configuration information of the MBMS service.

Optionally, the MBMS service scheduling stop information may carry an indication indicating that scheduling of the MBMS service is to be stopped, to notify the user equipment that scheduling of the MBMS service is to be stopped. After scheduling of the MBMS service is stopped when the predetermined condition is met, the MBMS service stop notification is sent to the user equipment, to notify the user equipment that the MBMS service is stopped.

Optionally, at the same time when or after the eNB notifies the user equipment of the service scheduling stop information, the eNB further sends a stop delaying indication, to notify the user equipment that stopping scheduling of the MBMS service will be delayed. After scheduling of the MBMS service is stopped when the predetermined condition is met, scheduling of the MBMS service is stopped.

The MBMS service stop delaying indication or the indication indicating that scheduling of the MBMS service is to be stopped may be sent to the user equipment by using any one of a point to multipoint control channel, a paging control channel, and MBMS transmission channel scheduling information. Specifically, if the stop delaying indication or the indication indicating that scheduling of the MBMS service is to be stopped is sent by using the point to multipoint control channel, the stop delaying indication or the indication indicating that scheduling of the MBMS service is to be stopped may be sent by using a counting request message carried on the point to multipoint control channel, for example, the stop delaying indication or the indication indicating that scheduling of the MBMS service is to be stopped is added to the counting request. If the stop delaying indication is sent by using the MBMS transmission channel scheduling information, the stop delaying indication or the indication indicating that scheduling of the MBMS service is to be stopped may be represented by using a special value in an MBMS traffic channel stop position indication (MTCH stop) field in the MBMS transmission channel scheduling information.

S103: The base station continues to schedule the MBMS service until a predetermined condition is met, and then, stops scheduling the MBMS service.

The eNB continues to schedule the MBMS service. Specifically, the eNB continues to indicate, in the MBMS transmission channel scheduling information (MSI), a sending position of the MBMS, so that the user equipment that needs to continue to receive the MBMS service triggers establishment of a unicast bearer, and in a process of the unicast bearer, the MBMS service is not interrupted or an interruption time is reduced.

The eNB may stop scheduling the MBMS service when one of the following conditions is met: a second notification, which is sent by the MCE, for stopping scheduling of the MBMS service is received, where the second notification for stopping scheduling of the MBMS service indicates that scheduling of the MBMS service is stopped; or after the first notification for stopping scheduling of the MBMS service is received, a time point indicated by the first notification for stopping scheduling of the MBMS service arrives; or after the first notification for stopping scheduling of the MBMS service is received, a first predetermined time passes; or after the first notification for stopping scheduling the service is received, a second predetermined time point arrives.

The foregoing three cases are specifically explained. The first case is that the MCE sends the first notification for stopping scheduling of the MBMS service to notify that scheduling of a service is to be stopped, and then, after a predetermined time, the MCE sends the second notification for stopping scheduling of the MBMS service, where the notification directly indicates that the eNB stops scheduling the MBMS service.

Another case is that the MCE directly adds the stop delaying indication to the first notification for stopping scheduling of the MBMS service and a scheduling stop time point is a predefined time point, for example, stops scheduling at a start time of a modification cycle after next after the first notification for stopping scheduling of the MBMS service is received, or the stop delaying indication carried in the first notification may indicate a specific delaying time, and the eNB stops scheduling the service after a period of time is delayed after receiving the first notification, of the MCE, for stopping scheduling of the MBMS service, or, stops scheduling the MBMS service after the time point indicated by the first notification arrives.

Still another case is that the first notification, which is sent by the MCE, for stopping scheduling of the MBMS service is only to notify that scheduling of an MBMS service is stopped (that is, the first notification is a common MBMS service scheduling stop notification), and after receiving the notification, the eNB voluntarily continues to schedule the MBMS for a first predetermined time, where the first predetermined time may be a time preset by a system.

After receiving the MBMS service scheduling stop information of the eNB, the user equipment determines that an MBMS service is to be stopped, but continues to listen to the MSI for a period of time. If the user equipment needs to continue to receive the MBMS service, the user equipment may trigger establishment of the unicast bearer, and after the unicast bearer is established, stops receiving a point to multipoint traffic channel (MTCH) corresponding to the MBMS service. A process of triggering establishment of the unicast bearer includes: sending, by an access layer of the user equipment to a higher layer of the user equipment, an indication indicating that the MBMS service cannot continue to be received; sending, by the higher layer of the user equipment to an application server, the indication indicating that the MBMS service cannot continue to be received; sending, by the application server, a unicast bearer establishment trigger request to the user equipment; and triggering, by the user equipment, establishment of the unicast bearer according to the trigger request.

In the foregoing embodiment of the method for maintaining service continuity, an eNB receives an MBMS service scheduling stop notification sent by the MCE, and the eNB sends MBMS service scheduling stop information to user equipment and continues to schedule the MBMS service. In this way, an MCE determines to stop scheduling of an MBMS service, and user equipment that needs to continue to receive the MBMS service can also continue to receive the service in a process of establishing a unicast bearer, thereby effectively reducing a service interruption time in the process of establishing the unicast bearer because the user equipment needs to continue to receive the service after scheduling of the service is stopped, and providing better use experience to a user.

Figure 2:
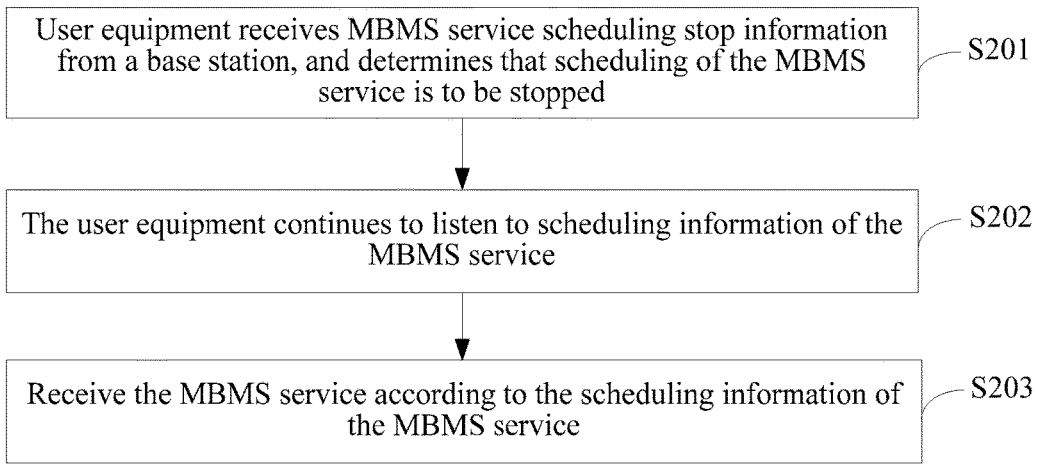
FIG. 2 is a flowchart of a second method for maintaining service continuity according to an embodiment of the present invention.

Referring to FIG. 2, FIG. 2 is a flowchart of a second method for maintaining service continuity according to an embodiment of the present invention. In this embodiment, a description is provided from the perspective of user equipment, and the method for maintaining service continuity in this embodiment includes:

S201: User equipment receives MBMS service scheduling stop information from a base station, and determines that the base station is to stop scheduling the MBMS service.

When determining to stop scheduling of an MBMS service, an MCE sends a scheduling stop notification to an eNB, and the eNB notifies user equipment of related information of an MBMS service whose scheduling is stopped, to notify the user equipment that scheduling of the MBMS service is to be stopped.

After receiving MBMS service scheduling stop information of the eNB, the user equipment determines that scheduling of the MBMS service is to be stopped. The user equipment may determine, by receiving a point to multipoint control channel message, according to that the message does not carry configuration information of an MBMS service, that scheduling of the MBMS service is to be stopped, or the point to multipoint control channel message still carries configuration information of an MBMS service, but the user equipment determines, according to an indication carried in the MBMS service scheduling stop information and indicating that scheduling is to be stopped, that scheduling of the MBMS service is to be stopped.

S202: The user equipment continues to listen to scheduling information of the MBMS service.

After receiving the MBMS service scheduling stop information, the user equipment continues to listen to scheduling information of the MBMS service, where the scheduling information of the MBMS service may be specifically MBMS transmission channel scheduling information (MSI), and the user equipment continues to receive the MBMS service according to a sending position, which is indicated in the MSI, of the MBMS service.

Optionally, the MBMS service scheduling stop information carries an indication indicating that scheduling of the MBMS service is to be stopped and used to indicate, to the user equipment, that scheduling of the MBMS service is to be stopped, and the user equipment continues to listen to the scheduling information of the MBMS service according to the indication indicating that scheduling of the MBMS service is to be stopped, until an MBMS service stop notification is received.

Optionally, at the same time when or after the user equipment receives the MBMS service scheduling stop information, the user equipment receives the MBMS service stop delaying indication from the eNB, and continues to listen to the scheduling information of the MBMS service according to the MBMS service stop delaying indication.

The user equipment may receive, by using any one of a point to multipoint control channel, a paging control channel, and MBMS transmission channel scheduling information, the MBMS service stop delaying indication or the indication indicating that scheduling of the MBMS service is to be stopped. Specifically, if the MBMS service stop delaying indication or the indication indicating that scheduling of the MBMS service is to be stopped is received by using the point to multipoint control channel, the MBMS service stop delaying indication or the indication indicating that scheduling of the MBMS service is to be stopped may be received by using a counting request message carried on the point to multipoint control channel, for example, the MBMS service stop delaying indication or the indication indicating that scheduling of the MBMS service is to be stopped is carried in the counting request. If the MBMS service stop delaying indication is received by using the MBMS transmission channel scheduling information, the MBMS service stop delaying indication or the indication indicating that scheduling of the MBMS service is to be stopped may be received by using a special value in an MBMS traffic channel stop position indication (MTCH stop) field in the MBMS transmission channel scheduling information.

S203: Receive the MBMS service according to the scheduling information of the MBMS service.

The user equipment receives the MBMS service according to the scheduling information of the MBMS service. Specifically, the scheduling information of the MBMS service is MBMS transmission channel scheduling information (MSI), and the receiving the MBMS service according to the scheduling information of the MBMS service includes: receiving the MBMS service according to a scheduling position, which is indicated in the MSI, of the MBMS service.

If the user equipment needs to continue to receive the MBMS service, the user equipment triggers establishment of a unicast bearer, and in a process of establishing the unicast bearer, the user equipment continues to listen to the scheduling information of the MBMS service. After the unicast bearer is established completely, receiving a point to multipoint traffic channel corresponding to the MBMS service is stopped, and the MBMS service continues to be received by using the unicast bearer. A process of triggering establishment of the unicast bearer includes: sending, by an access layer of the user equipment to a higher layer of the user equipment, an indication indicating that the MBMS service cannot continue to be received; sending, by the higher layer of the user equipment to an application server, the indication indicating that the MBMS service cannot continue to be received; sending, by the application server, a unicast bearer establishment trigger request to the user equipment; and triggering, by the user equipment, establishment of the unicast bearer according to the trigger request.

Figure 3:
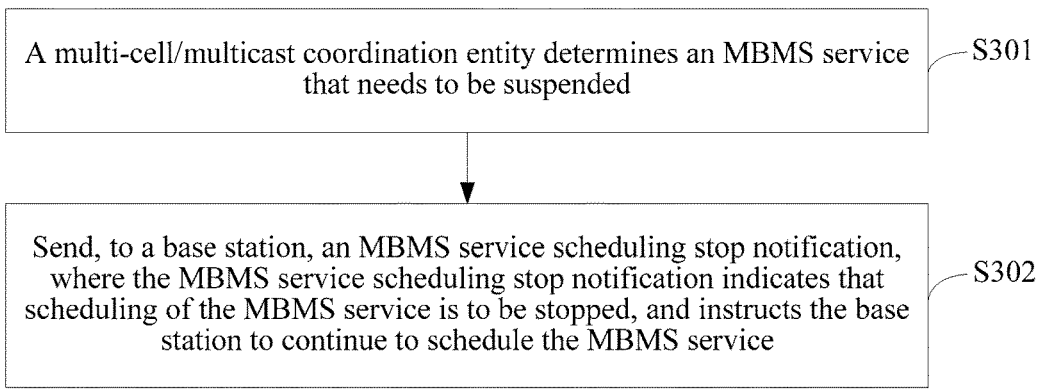
FIG. 3 is a flowchart of a third method for maintaining service continuity according to an embodiment of the present invention.

Certainly, if the scheduling information of the MBMS service no longer includes configuration information of the MBMS service, receiving the MBMS service is stopped, or, receiving the MBMS service is stopped after a first predetermined time after the MBMS service scheduling stop information is received. Referring to FIG. 3, FIG. 3 is a flowchart of a third method for maintaining service continuity according to an embodiment of the present invention. In this embodiment, a description is provided from the perspective of an MCE, and the method for maintaining service continuity in this embodiment includes:

S301: A multi-cell/multicast coordination entity determines an MBMS service that needs to be suspended.

An MCE first triggers an eNB to perform statistics on user equipments that receive an MBMS service, and determines, according to a statistical response of the eNB, a quantity of the user equipments of the MBMS service, and when the quantity of the user equipments that receive the MBMS service is less than a predetermined threshold, the MCE determines to stop an MBSFN transmission manner of the MBMS service.

Alternatively, an MCE receives an MBMS service stop notification sent by a group communication server, and determines, according to the MBMS service stop notification, to stop an MBSFN transmission manner of the MBMS service.

S302: Send an MBMS service scheduling stop notification to a base station, where the MBMS service scheduling stop notification notifies the base station that when a predetermined condition is met, scheduling of the MBMS service will be stopped, and instructs the base station to continue to schedule the MBMS service.

The MCE sends, to the eNB, the MBMS service scheduling stop notification, where the MBMS service scheduling stop notification notifies the base station that when a predetermined condition is met, scheduling of the MBMS service will be stopped, and instructs the eNB to continue to schedule the MBMS service. The predetermined condition may be a predetermined time or a predetermined time point. Certainly, the predetermined condition may also be another condition.

The MCE may update configuration information of the eNB by using MBMS scheduling information, where the updated configuration information no longer carries configuration information of the MBMS service that needs to be suspended, and is used as the MBMS service scheduling stop notification sent to the eNB.

The MCE instructs the eNB to stop scheduling the MBMS service, where the quantity of the user equipments that receive the MBMS service is less than the predetermined threshold, for example, stop scheduling a service 1.

The MBMS service scheduling stop notification may further carry a stop delaying indication, to instruct the eNB to delay stopping scheduling the MBMS service. Further, the MBMS service scheduling stop notification may further include stop delaying time length information or stop timestamp information, used to instruct the eNB to stop scheduling the MBMS service after a specified time is delayed.

For example, if the MCE determines to stop scheduling of the service 1, the MCE sends, to the eNB, a notification for stopping scheduling of the service 1, where the notification may be used to indicate that scheduling of the service 1 is to be stopped. Further, the notification may further carry a stop delaying indication, to instruct the eNB to delay stopping scheduling the service 1, and according to the MBMS service scheduling stop indication, the eNB continues to schedule the service for a period of time, and then, stops scheduling the service. A stop delaying time may be further specified, used to indicate a relative time of a scheduling stop time relative to a received first notification for stopping scheduling, for example, 10 minutes, 5 minutes, two modification cycles, or another piece of time information, or timestamp information may be specified, for example, 12:30, 12:40, or another piece of specific timestamp information.

Certainly, at the same time when or after the MCE sends the MBMS service scheduling stop notification, the MCE may also send a stop delaying indication, to instruct the eNB to delay stopping scheduling the MBMS service.

Another manner is that the MCE first sends, to the eNB, a first notification for stopping scheduling of the service 1, where the first notification indicates that scheduling of the service 1 is to be stopped, and then, sends a second notification for stopping scheduling of the service 1, where the second notification directly indicates that the eNB will stop scheduling the service 1 right now.

Optionally, the first notification for stopping scheduling of the MBMS service is carried by using MBMS scheduling information, and when the MBMS scheduling information no longer carries configuration information of the MBMS service, it indicates that scheduling of the MBMS service is to be stopped.

Figure 4:
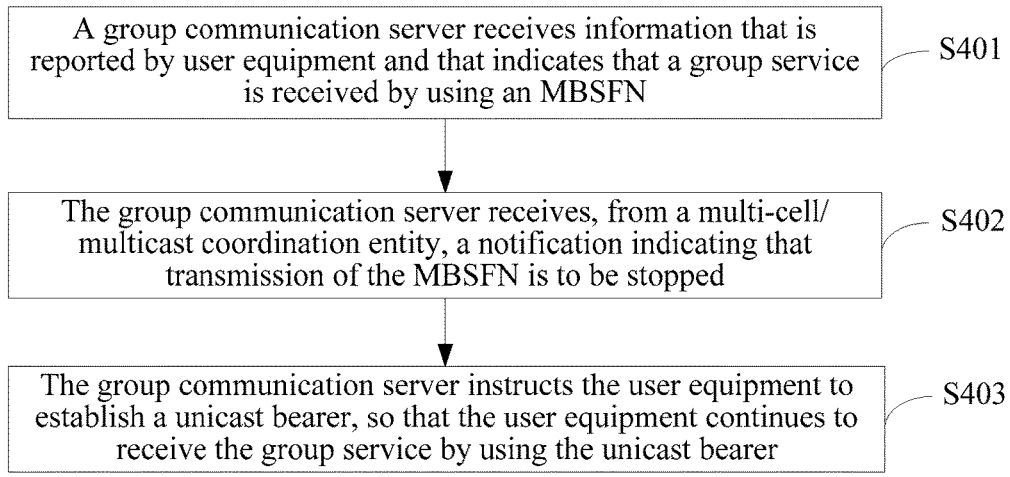
FIG. 4 is a flowchart of a fourth method for maintaining service continuity according to an embodiment of the present invention.

Referring to FIG. 4, FIG. 4 is a flowchart of a fourth method for maintaining service continuity according to an embodiment of the present invention. In this embodiment, a description is provided from the perspective of a group communication server, and the method for maintaining service continuity in this embodiment includes:

S401: A group communication server receives information that is reported by user equipment and that indicates that a group service is received by using an MBSFN.

In group communication, in an MBSFN area, data of a group service is carried in an MBMS service, a group communication server is configured to manage user equipment in a group, and before receiving the data of the group service, the user equipment first needs to register with the group communication server.

If the user equipment receives the group communication server in an MBSFN manner for communication, the user equipment may report, to the group communication server, information indicating that the user equipment is receiving the group service in the MBSFN manner, and information about the group service includes at least one of an MBSFN area identifier of the group service, and an identifier of a cell in which the group service is located.

S402: The group communication server receives, from a multi-cell/multicast coordination entity, a notification for stopping transmission of the MBSFN used to receive the group service.

If an MCE determines to stop scheduling of an MBMS service, before the MCE instructs an eNB to stop scheduling the MBMS service, the MCE first notifies the group communication server. The MCE may report, to the group communication server, information about a service that is to be stopped by the MCE, for example, an MBSFN area identifier, or an MBMS server identifier.

The group communication server receives, from the MCE, a notification indicating that transmission of an MBSFN is to be stopped.

S403: The group communication server instructs the user equipment to establish a unicast bearer, so that the user equipment continues to receive the group service by using the unicast bearer after the MBSFN used to receive the group service is stopped.

After receiving a notification indicating that transmission of an MBSFN is to be stopped, the group communication server instructs the user equipment to establish a unicast bearer, so that after the MBSFN used to receive the group service is stopped, the group service continues to be received by using the unicast bearer in replacement of the MBSFN. Preferably, only the user equipment that needs to continue to receive the group service may be instructed to establish a unicast bearer.

The user equipment that needs to continue to receive the group service triggers establishment of the unicast bearer according to the notification of the group communication server, so as to continue to receive the group service on the unicast bearer after transmission of the MBSFN is stopped. After the user equipment establishes the unicast bearer, the group communication server instructs the MCE to stop transmission of the MBSFN.

Specifically, if the user equipment receives group communication data by using the MBMS service, an access layer of the user equipment determines that an MBMS service is to be stopped, and sends an indication to a higher layer of the user equipment; the higher layer of the user equipment reports, to the group communication server, that a group service corresponding to the MBMS service cannot continue to be received in the MBSFN manner; after the group communication server receives the request, if the group communication server determines that the group service needs to continue to be sent to the user equipment, the group communication server triggers the user equipment to establish a unicast bearer to continue to receive the group service. The unicast bearer is a dedicated radio bearer, used to transmit the MBMS service, between the user equipment and the base station.

Before reporting, to the group communication server, that the group service corresponding to the MBMS service cannot continue to be received in the MBSFN manner, the higher layer of the user equipment needs to establish a connection to the eNB. In order to prevent network congestion caused when many user equipments simultaneously initiate a connection establishment process, after receiving MBMS service scheduling stop information of the eNB, the user equipment may perform random backoff, to prevent many user equipments from simultaneously triggering a unicast connection establishment process. Specifically, the user equipment generates a random factor to compare with a predetermined threshold, and determines, according to a comparison result, a delay for triggering a unicast establishment process. For example, a predetermined random factor is 0.5, a random number generated by a user is 0.6, and 0.6>0.5; therefore, the user equipment triggers connection establishment after a delay of 10 ms.

Through a detailed description of this embodiment, it may be understood that, according to the method for maintaining service continuity in this embodiment, when an MCE determines to stop transmission of an MBSFN that needs to be stopped, before the MCE notifies an eNB, the MCE first notifies a group communication server that manages user equipment in a group; and the group communication server instructs the user equipment to establish a unicast bearer, and after the user equipment establishes the unicast bearer, instructs the MCE to stop transmission of the MBSFN. In this way, when an MCE determines to stop transmission of an MBSFN, user equipment that needs to continue to receive a group service by using the MBSFN first establishes a unicast bearer according to a notification of a group communication server, thereby preventing the group service from being interrupted, and providing better use experience to a user.

Figure 5:
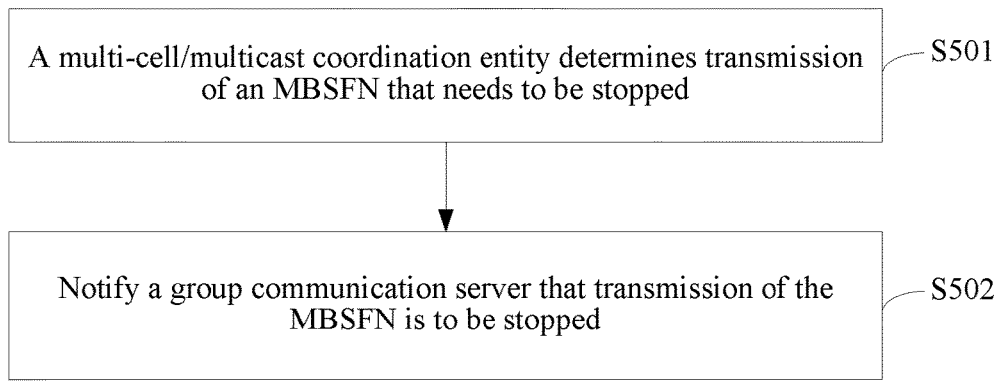
FIG. 5 is a flowchart of a fifth method for maintaining service continuity according to an embodiment of the present invention.

Referring to FIG. 5, FIG. 5 is a flowchart of a fifth method for maintaining service continuity according to an embodiment of the present invention. In this embodiment, a description is provided from the perspective of an MCE, and the method for maintaining service continuity in this embodiment includes:

S501: A multi-cell/multicast coordination entity determines transmission of an MBSFN that needs to be stopped.

An MCE first triggers an eNB to perform statistics on user equipments that receive an MBMS service, and determines, according to a statistical response of the eNB, a quantity of the user equipments of the MBMS service, and when the quantity of the user equipments that receive the MBMS service is less than a predetermined threshold, that an MBSFN transmission manner of the MBMS service needs to be stopped.

S502: Notify a group communication server that transmission of the MBSFN is stopped.

When the MCE determines to stop transmission of an MBSFN of an MBMS service, before the MCE instructs an eNB to stop scheduling the MBMS service, the MCE first notifies the group communication server. The MCE may report, to the group communication server, information about a service that is to be stopped by the MCE, for example, an MBSFN area identifier, or an MBMS server identifier. Therefore, the group communication server instructs user equipment to establish a unicast bearer, so that the user equipment continues to receive a group service by using the unicast bearer in replacement of the MBSFN after transmission of the MBSFN is stopped.

After the group communication server is notified that transmission of the MBSFN is to be stopped, after a predetermined period of time, MBMS service scheduling stop information is sent to the eNB, so that the eNB stops scheduling the MBMS service.

The group communication server is configured to manage user equipment in a group of the group communication server, and after receiving a notification indicating that transmission of the MBSFN is to be stopped, the group communication server may instruct the user equipment to establish the unicast bearer, so that after transmission of the MBSFN that receives the group service is stopped, the group service can also continue to be received by using the unicast bearer.

Figure 6:
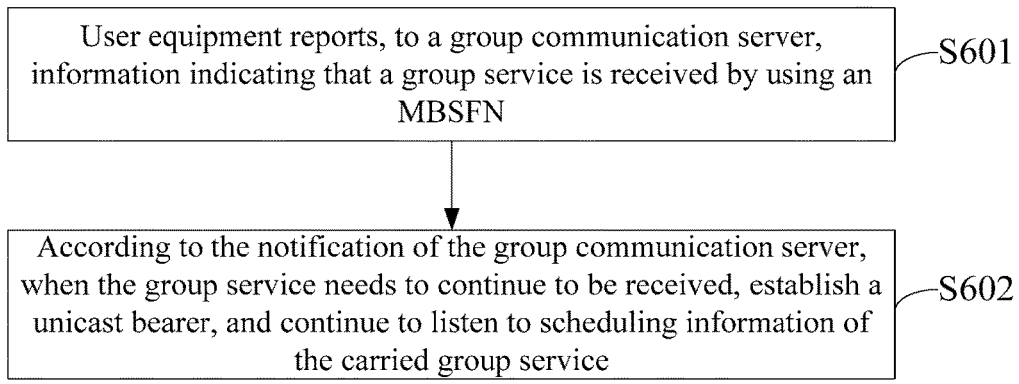
FIG. 6 is a flowchart of a sixth method for maintaining service continuity according to an embodiment of the present invention.

Referring to FIG. 6, FIG. 6 is a flowchart of a sixth method for maintaining service continuity according to an embodiment of the present invention. In this embodiment, a description is provided from the perspective of user equipment, and the method for maintaining service continuity in this embodiment includes:

S601: User equipment reports, to a group communication server, information indicating that a group service is received by using an MBSFN.

In group communication, in an MBSFN area, data of a group service is carried in an MBMS service, a group communication server is configured to manage user equipment in a group, and before receiving the data of the group service, the user equipment first needs to register with the group communication server.

If the user equipment receives the group service in an MBSFN manner, the user equipment may report, to the group communication server, information indicating that the user equipment is receiving the group service in the MBSFN manner, and information about the group service includes at least one of an MBSFN area identifier of the group service, and an identifier of a cell in which the group service is located.

S602: Establish a unicast bearer according to a unicast bearer establishment notification of the group communication server, and continue to listen to scheduling information of the carried group service.

If an MCE determines to stop scheduling of an MBMS service, before the MCE instructs an eNB to stop scheduling the MBMS service, the MCE first notifies the group communication server. The MCE may report, to the group communication server, information about a service that is to be stopped by the MCE, for example, an MBSFN area identifier, or an MBMS server identifier.

The group communication server receives, from the MCE, a notification indicating that transmission of an MBSFN is to be stopped.

After receiving the notification indicating that transmission of the MBSFN is to be stopped, the group communication server instructs the user equipment to establish a unicast bearer, so as to continue to receive the group service by using the unicast bearer. Preferably, only the user equipment that needs to continue to receive the group service may be instructed to establish a unicast bearer.

The user equipment that needs to continue to receive the group service triggers establishment of the unicast bearer according to the notification of the group communication server, so as to continue to receive the group service on the unicast bearer after transmission of the MBSFN is stopped. After the user equipment establishes the unicast bearer, the group communication server instructs the MCE to stop transmission of the MBSFN.

In a process of establishing the unicast bearer, the user equipment continues to listen to scheduling information of the carried group service, and after the unicast bearer is established completely, the user equipment stops listening to the scheduling information of the carried group service, and continues to receive the group service by using the unicast bearer.

Figure 7:
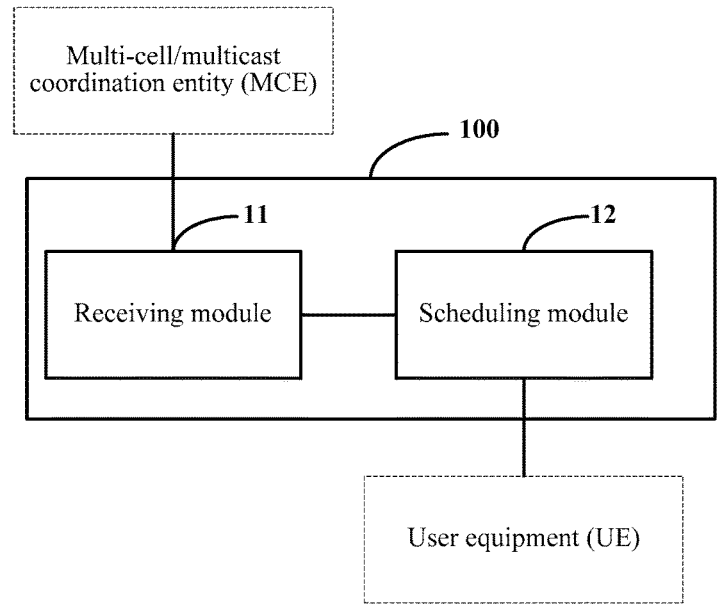
FIG. 7 is a schematic structural diagram of a first base station according to an embodiment of the present invention.

Referring to FIG. 7, FIG. 7 is a schematic structural diagram of a first base station 100 according to an embodiment of the present invention. The base station 100 in this embodiment includes a receiving module 11 and a scheduling module 12.

The receiving module 11 is configured to receive a first notification, which is sent by an MCE, for stopping scheduling of an MBMS service.

An MCE first triggers an eNB to perform statistics on user equipments that receive an MBMS service, and determines, according to a statistical response of the eNB, a quantity of the user equipments of the MBMS service, and when the quantity of the user equipments that receive the MBMS service is less than a predetermined threshold, the MCE determines to stop scheduling of the MBMS service. The MCE instructs the eNB to stop scheduling the MBMS service, where the quantity of the user equipments that receive the MBMS service is less than the predetermined threshold, for example, stop scheduling a service 1.

The eNB receives, by using the receiving module 11, a first notification, which is sent by the MCE, for stopping scheduling of an MBMS service. The first notification for stopping scheduling of the MBMS service is a notification that is sent by the MCE to the base station when the MCE determines to suspend the MBMS service, and the first notification for stopping scheduling of the MBMS service may be used to indicate that scheduling of an MBMS service will be stopped when a predetermined condition is met. The predetermined condition may be after a particular time, at a fixed time point, or the like. Certainly, the predetermined condition may also be another specified condition.

Optionally, the first notification for stopping scheduling of the MBMS service may further carry a stop delaying indication, to instruct the eNB to delay stopping scheduling the MBMS service. Further, the first notification for stopping scheduling of the MBMS service may further include stop delaying time length information or stop timestamp information, used to instruct the eNB to stop scheduling the MBMS service after a specified time is delayed.

For example, if the MCE determines to stop scheduling of the service 1, the MCE sends, to the eNB, a first notification for stopping scheduling of the service 1, where the notification may be used to indicate that scheduling of the service 1 is to be stopped, or the first notification may carry a stop delaying indication, to instruct the eNB to delay stopping scheduling the service 1, and according to the MBMS service stop delaying indication, the eNB continues to schedule the service for a period of time and then, stops scheduling the service. A stop delaying time may be further specified, used to indicate a relative time of a scheduling stop time relative to the received first notification for stopping scheduling, for example, 10 minutes, 5 minutes, two modification cycles, or another piece of time information, or timestamp information may be specified, for example, 12:30, 12:40, or another piece of specific timestamp information.

Optionally, the first notification for stopping scheduling of the MBMS service is carried by using MBMS scheduling information, and when the MBMS scheduling information no longer carries configuration information of the MBMS service, it indicates that scheduling of the MBMS service is to be stopped.

The scheduling module 12 is configured to: after the receiving module 11 receives the first notification for stopping scheduling of the MBMS service, send the MBMS service scheduling stop information to user equipment, and continue to schedule the MBMS service until a predetermined condition is met, and then, stop scheduling the MBMS service.

After the eNB receives the first notification, of the MCE, for stopping scheduling of the MBMS service, the eNB sends the MBMS service scheduling stop information to the user equipment by using the scheduling module 12.

The scheduling module 12 may send MBMS service scheduling stop information to the user equipment by using a point to multipoint control channel message not carrying configuration information of an MBMS service.

Optionally, the MBMS service scheduling stop information may carry a stop delaying indication, to notify the user equipment that stopping scheduling of the MBMS service will be delayed.

Optionally, at the same time when or after the scheduling module 12 notifies the user equipment of the service scheduling stop information, the scheduling module 12 further sends a stop delaying indication, to notify the user equipment that stopping scheduling of the MBMS will be delayed.

Optionally, the MBMS service scheduling stop information may carry an indication indicating that scheduling of the MBMS service is to be stopped, to notify the user equipment that scheduling of the MBMS service is to be stopped.

The MBMS service stop delaying indication or the indication indicating that scheduling of the MBMS service is to be stopped may be sent to the user equipment by using any one of a point to multipoint control channel, a paging control channel, and MBMS transmission channel scheduling information. Specifically, if the MBMS service stop delaying indication is sent by using the point to multipoint control channel, the MBMS service stop delaying indication may be sent by using a counting request message carried on the point to multipoint control channel, for example, the MBMS service stop delaying indication is added to the counting request. If the MBMS service stop delaying indication is sent by using the MBMS transmission channel scheduling information, the MBMS service stop delaying indication may be represented by using a special value in an MBMS traffic channel stop position indication (MTCH stop) field in the MBMS transmission channel scheduling information.

The eNB continues to schedule the MBMS service by using the scheduling module 12, so that the user equipment that needs to continue to receive the MBMS service triggers establishment of a unicast bearer, and in a process of the unicast bearer, the MBMS service is not interrupted or an interruption time is reduced.

The scheduling module 12 stops scheduling the MBMS service when one of the following conditions is met: the receiving module 11 receives a second notification, which is sent by the MCE, for stopping scheduling of the MBMS service, where the second notification for stopping scheduling of the MBMS service indicates that scheduling of the MBMS service is stopped; or after the receiving module 11 receives the first notification for stopping scheduling of the MBMS service, a time point indicated by the first notification for stopping scheduling of the MBMS service arrives; or after the receiving module 11 receives the first notification for stopping scheduling of the MBMS service, a first predetermined time passes; or after the first notification for stopping scheduling of the service is received, a second predetermined time point arrives.

That is, the MCE may send the first notification for stopping scheduling of the MBMS service to notify that scheduling of a service is to be stopped, and then, after a predetermined time, the MCE sends the second notification for stopping scheduling of the MBMS service, where the notification directly indicates that the eNB stops scheduling the MBMS service.

The MCE may also directly add the stop delaying indication to the first notification for stopping scheduling of the MBMS service and a scheduling stop time point is a predefined time point, for example, stop scheduling at a start time of a modification cycle after next after the first notification for stopping scheduling of the MBMS service is received, or the stop delaying indication carried in the first notification may indicate a specific delaying time, and the eNB stops scheduling the service after a period of time is delayed after receiving the first notification, of the MCE, for stopping scheduling of the MBMS service, or, further stop scheduling the MBMS service after the time point indicated by the first notification arrives.

Further, the first notification, which may be sent by the MCE, for stopping scheduling of the MBMS service is only to notify that scheduling of an MBMS service is stopped (that is, the first notification is a common MBMS service scheduling stop notification), and after receiving the notification, the eNB voluntarily continues to schedule the MBMS for a first predetermined time, where the first predetermined time may be a time preset by a system.

After receiving the MBMS service scheduling stop information of the eNB, the user equipment determines that an MBMS service is to be stopped, but continues to listen to the MSI for a period of time. If the user equipment needs to continue to receive the MBMS service, the user equipment may trigger establishment of the unicast bearer, and after the unicast bearer is established, stops receiving a point to multipoint traffic channel (MTCH) corresponding to the MBMS service.

The base station provided by this embodiment can implement the steps in the embodiment shown in FIG. 1, and division of functional modules of the base station in this embodiment is only exemplary, and under the premise that the objective of the present invention can be achieved, division of the functional modules of the base station is not limited to the foregoing manner, and may be another possible implementation manner. For example, multiple units or components may be combined or integrated into another system, or some features may be ignored or not performed.

Figure 8:
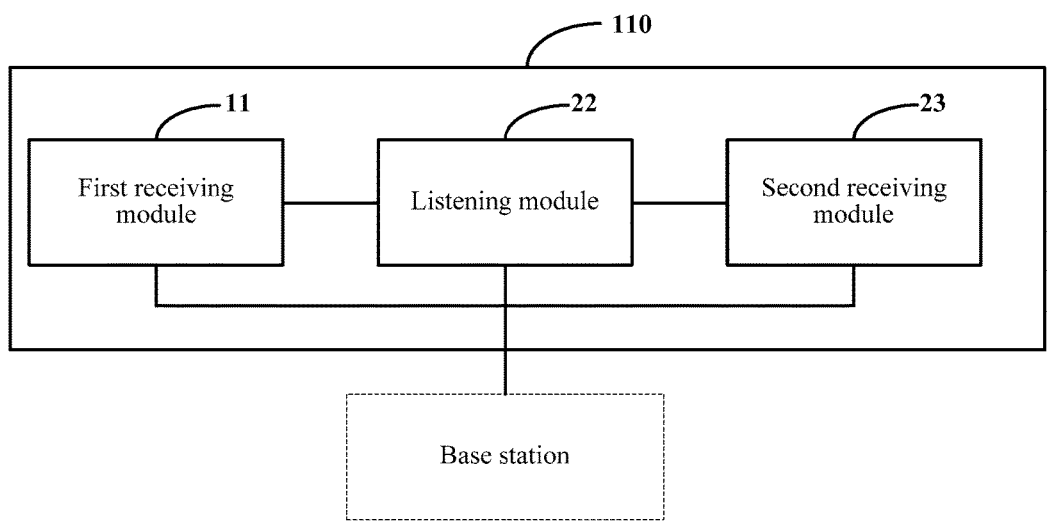
FIG. 8 is a schematic structural diagram of first user equipment according to an embodiment of the present invention.

Referring to FIG. 8, FIG. 8 is a schematic structural diagram of first user equipment according to an embodiment of the present invention. The user equipment 110 in this embodiment includes a first receiving module 21, a listening module 22, and a second receiving module 23.

The first receiving module 21 is configured to receive MBMS service scheduling stop information from a base station, and determine that the base station is to stop scheduling the MBMS service.

When determining to stop scheduling of an MBMS service, an MCE sends a scheduling stop notification to an eNB, and the eNB notifies user equipment of related information of an MBMS service whose scheduling is stopped, to notify the user equipment that scheduling of the MBMS service is to be stopped. That is, the base station will stop scheduling the MBMS service when a predetermined condition is met. The predetermined condition may be a predetermined time, a predetermined time point, or a scheduling stop notification is received again. Certainly, the predetermined condition may also be another condition.

After receiving MBMS service scheduling stop information of the eNB by using the first receiving module 21, the user equipment determines that scheduling of the MBMS service is to be stopped. The first receiving module 21 may determine, by receiving a point to multipoint control channel message, according to that the message does not carry configuration information of an MBMS service, that scheduling of the MBMS service is to be stopped, or the point to multipoint control channel message still carries configuration information of an MBMS service, but the first receiving module 21 determines, according to an indication carried in the MBMS service scheduling stop information and indicating that scheduling is to be stopped, that scheduling of the MBMS service is to be stopped.

The listening module 22 is configured to: after the first receiving module 21 determines that when a predetermined condition is met, the scheduling of the MBMS service will be stopped, continue to listen to scheduling information of the MBMS service.

After the first receiving module 21 receives the MBMS service scheduling stop information, the listening module 22 continues to listen to scheduling information of the MBMS service, where the scheduling information of the MBMS service may be specifically MBMS transmission channel scheduling information (MSI), and the user equipment continues to receive the MBMS service according to a sending position, which is indicated in the MSI, of the MBMS service.

Optionally, the MBMS service scheduling stop information carries a stop delaying indication, used to indicate, to the user equipment, that stopping scheduling of the MBMS service will be delayed, and the listening module 22 continues to listen to the scheduling information of the MBMS service according to the stop delaying indication.

Optionally, the MBMS service scheduling stop information carries an indication indicating that scheduling of the MBMS service is to be stopped and used to indicate, to the user equipment, that scheduling of the MBMS is to be stopped, and the listening module is configured to determine, according to the indication indicating that scheduling of the MBMS service is to be stopped, that the base station is to stop scheduling the MBMS service.

Optionally, at the same time when or after the first receiving module 21 receives the MBMS service scheduling stop information, the first receiving module 21 receives the MBMS service stop delaying indication from the eNB, and the listening module 22 continues to listen to the scheduling information of the MBMS service according to the MBMS service stop delaying indication.

The first receiving module 21 may receive, by using any one of a point to multipoint control channel, a paging control channel, and MBMS transmission channel scheduling information, the MBMS service stop delaying indication or the indication indicating that scheduling of the MBMS service is to be stopped. Specifically, if the MBMS service stop delaying indication is received by using the point to multipoint control channel, the MBMS service stop delaying indication may be received by using a counting request message carried on the point to multipoint control channel, for example, the MBMS service stop delaying indication is carried in the counting request. If the MBMS service stop delaying indication is received by using the MBMS transmission channel scheduling information, the MBMS service stop delaying indication may be received by using a special value in an MBMS traffic channel stop position indication (MTCH stop) field in the MBMS transmission channel scheduling information.

The second receiving module 23 is configured to receive the MBMS service according to the scheduling information of the MBMS service that is listened to and obtained by the listening module 22.

The second receiving module 23 receives the MBMS service according to the scheduling information of the MBMS service that is listened to and obtained by the listening module 22. Specifically, the scheduling information of the MBMS service is MBMS transmission channel scheduling information (MSI), and the receiving the MBMS service according to the scheduling information of the MBMS service includes: receiving the MBMS service according to a scheduling position, which is indicated in the MSI, of the MBMS service.

If the user equipment needs to continue to receive the MBMS service, the user equipment triggers establishment of a unicast bearer, and in a process of establishing the unicast bearer, the listening module 22 continues to listen to the scheduling information of the MBMS service. After the unicast bearer is established completely, the second receiving module 23 stops receiving a point to multipoint traffic channel corresponding to the MBMS service, and continues to receive the MBMS service by using the unicast bearer.

Certainly, if the scheduling information of the MBMS service no longer includes configuration information of the MBMS service, the second receiving module 23 stops receiving the MBMS service.

The user equipment further includes a unicast establishment module, where the unicast establishment module is configured to: after the user equipment determines that the base station is to stop scheduling the MBMS service, trigger establishment of a unicast bearer.

After the unicast bearer is established completely, the second receiving module stops receiving the MBMS service by using a point to multipoint traffic channel corresponding to the MBMS service.

The user equipment in this embodiment can implement the steps in the embodiment shown in FIG. 2, and division of functional modules of the user equipment in this embodiment is only exemplary, and under the premise that the objective of the present invention can be achieved, division of the functional modules of the user equipment is not limited to the foregoing manner, and may be another possible implementation manner. For example, multiple units or components may be combined or integrated into another system, or some features may be ignored or not performed.

Figure 9:
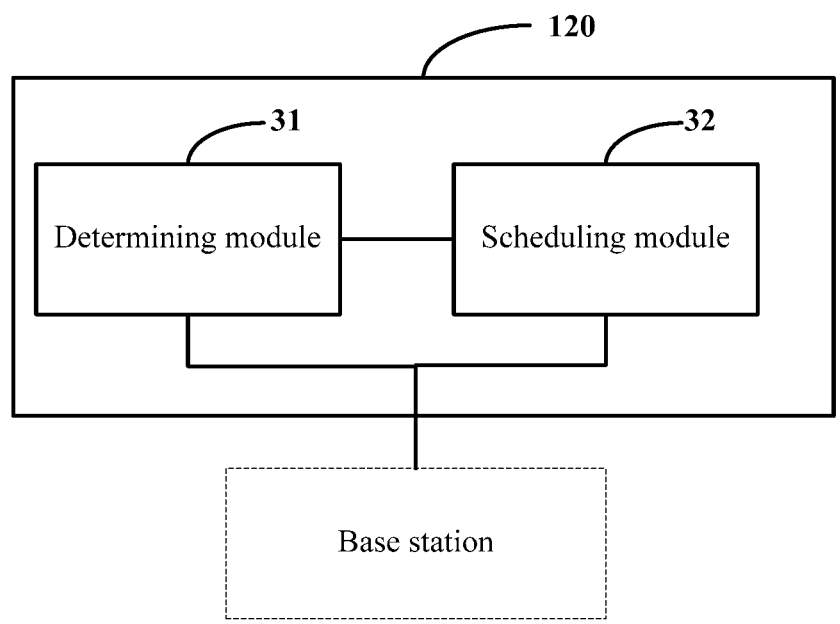
FIG. 9 is a schematic structural diagram of a first multi-cell/multicast coordination entity according to an embodiment of the present invention.

Referring to FIG. 9, FIG. 9 is a schematic structural diagram of a first multi-cell/multicast coordination entity according to an embodiment of the present invention. The multi-cell/multicast coordination entity 120 in this embodiment includes a determining module 31 and a scheduling module 32.

The determining module 31 is configured to determine an MBMS service that needs to be suspended.

An MCE first triggers an eNB to perform statistics on user equipments that receive an MBMS service, and determines, according to a statistical response of the eNB, a quantity of the user equipments of the MBMS service, and when the quantity of the user equipments that receive the MBMS service is less than a predetermined threshold, the MCE determines, by using the determining module 31, to stop an MBSFN transmission manner of the MBMS service.

The scheduling module 32 is configured to: when the determining module 31 determines that the MBMS service needs to be suspended, send the MBMS service scheduling stop notification to a base station, where the MBMS service scheduling stop notification notifies the base station that when a predetermined condition is met, scheduling of the MBMS service will be stopped, and instructs the base station to continue to schedule the MBMS service.

When the determining module 31 determines that an MBMS service needs to be suspended, the MCE sends MBMS service scheduling stop notification to the eNB by using the scheduling module 32, where the MBMS service scheduling stop notification notifies the base station that when a predetermined condition is met, scheduling of the MBMS service will be stopped, and instructs the eNB to continue to schedule the MBMS service.

The scheduling module 32 may update configuration information of the eNB by using MBMS scheduling information, where the updated configuration information no longer carries configuration information of the MBMS service that needs to be suspended, and is used as the MBMS service scheduling stop notification sent to the eNB.

The scheduling module 32 instructs the eNB to stop scheduling the MBMS service, where the quantity of the user equipments that receive the MBMS service is less than the predetermined threshold, for example, stop scheduling a service 1.

The MBMS service scheduling stop notification may further carry a stop delaying indication, to instruct the eNB to delay stopping scheduling the MBMS service. Further, the MBMS service scheduling stop notification may further include stop delaying time length information or stop timestamp information, used to instruct the eNB to stop scheduling the MBMS service after a specified time is delayed.

For example, if the MCE determines to stop scheduling of the service 1, the MCE sends, to the eNB by using the scheduling module 32, a notification for stopping scheduling of the service 1, where the notification may be used to indicate that scheduling of the service 1 is to be stopped. Further, the notification may further carry a stop delaying indication, to instruct the eNB to delay stopping scheduling the 1, and according to the MBMS service stop delaying indication, the eNB continues to schedule the service 1 for a period of time, and then, stops scheduling the service. A stop delaying time may be further specified, used to indicate a relative time of a scheduling stop time relative to a received first notification for stopping scheduling, for example, 10 minutes, 5 minutes, two modification cycles, or another piece of time information, or timestamp information may be specified, for example, 12:30, 12:40, or another piece of specific timestamp information.

Certainly, at the same time when or after the scheduling module 32 sends the MBMS service scheduling stop notification, the scheduling module 32 may also send a stop delaying indication, to instruct the eNB to delay stopping scheduling the MBMS service.

Another manner is that the MCE first sends, to the eNB by using the scheduling module 32, a first notification for stopping scheduling of the service 1, where the first notification indicates that scheduling of the service 1 is to be stopped, and then, sends a second notification for stopping scheduling of the service 1, where the second notification directly indicates that the eNB will stop scheduling the service 1 right now.

Optionally, the first notification for stopping scheduling of the MBMS service is carried by using MBMS scheduling information, and when the MBMS scheduling information no longer carries the MBMS service, it indicates that scheduling of the MBMS service is to be stopped.

The multi-cell/multicast coordination entity in this embodiment can implement the steps in the embodiment shown in FIG. 3, and division of functional modules of the multi-cell/multicast coordination entity in this embodiment is only exemplary, and under the premise that the objective of the present invention can be achieved, division of the functional modules of the multi-cell/multicast coordination entity is not limited to the foregoing manner, and may be another possible implementation manner. For example, multiple units or components may be combined or integrated into another system, or some features may be ignored or not performed.

Figure 10:
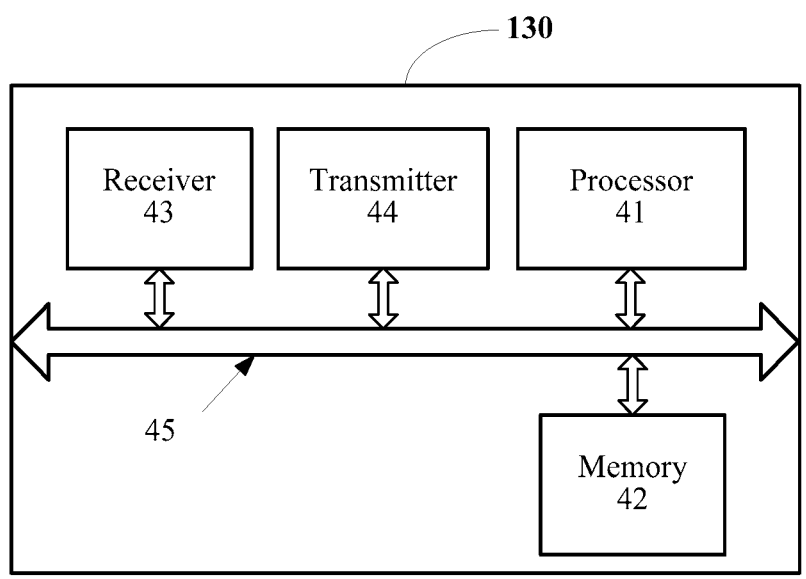
FIG. 10 is a schematic structural diagram of a second base station according to an embodiment of the present invention.

Referring to FIG. 10, FIG. 10 is a schematic structural diagram of a second base station according to an embodiment of the present invention. The base station 130 in this embodiment includes a processor 41, a memory 42, a receiver 43, a transmitter 44, and a bus system 45.

The processor 41 controls an operation of the base station 130, and the processor 41 may be further referred to as a CPU (Central Processing Unit). The processor 41 may be an integrated circuit chip and has a signal processing capability. The processor 41 may be a general purpose processor, a digital signal processor (DSP), an application-specific integrated circuit (ASIC), a field programmable gate array (FPGA), or another programmable logical device, discrete gate or transistor logical device, or discrete hardware component. The general purpose processor may be a microprocessor or the processor may be any conventional processor and the like.

The memory 42 may include a read-only memory and a random access memory, and provides an instruction and data to the processor 41. A part of the memory 42 may further include a non-volatile random access memory (NVRAM).

Components of the base station 130 are coupled together by using the bus system 45, and in addition to including a data bus, the bus system 45 further includes a power bus, a control bus, and a state signal bus. The bus system may be an ISA (Industry Standard Architecture) bus, a PCI (Peripheral Component Interconnect) bus, an EISA (Extended Industry Standard Architecture) bus, or the like. The bus may be one or more physical lines, and when the bus is multiple physical lines, the bus may be classified into an address bus, a data bus, a control bus, and the like. In some other embodiments of the present invention, the processor 41, the memory 42, the receiver 43, and the transmitter 44 may also be directly connected by using a communication line. However, for clear description, various buses are marked as the bus system 45 in the figure.

The memory 42 stores the following elements, executable modules or data structures, or a subset thereof, or an extension set thereof:

operation instructions: including various operation instructions, used to implement various operations; and an operating system: including various system programs, configured to implement various fundamental services and process a hardware-based task.

In this embodiment of the present invention, the processor 41 performs the following operations by invoking an operation instruction (the operation instruction may be stored in an operating system) stored in the memory 42:

the processor 41 is configured to control the receiver 43 to receive a first notification, which is sent by an MCE, for stopping scheduling of an MBMS service, where the first notification for stopping scheduling of the MBMS service is a notification that is sent by the MCE to the base station after the MCE determines to suspend the MBMS service; and after the first notification for stopping scheduling of the MBMS service is received, control the transmitter 44 to send MBMS service scheduling stop information to user equipment; and the processor 41 continues to schedule the MBMS service until a predetermined condition is met, and then, stops scheduling the MBMS service.

The memory 42 is configured to store the MBMS data.

An MCE first triggers an eNB to perform statistics on user equipments that receive an MBMS service, and determines, according to a statistical response of the eNB, a quantity of the user equipments of the MBMS service, and when the quantity of the user equipments that receive the MBMS service is less than a predetermined threshold, the MCE determines to stop scheduling of the MBMS service. The MCE instructs the eNB to stop scheduling the MBMS service, where the quantity of the user equipments that receive the MBMS service is less than the predetermined threshold, for example, stop scheduling a service 1.

The processor 41 controls the receiver 43 to receive the first notification, which is sent by the MCE, for stopping scheduling of the MBMS service. The first notification for stopping scheduling of the MBMS service may be used to indicate that scheduling of an MBMS service will be stopped when a predetermined condition is met. The predetermined condition may be after a particular time, at a fixed time point, or the like. Certainly, the predetermined condition may also be another specified condition.

Optionally, the first notification for stopping scheduling of the MBMS service may further carry a stop delaying indication, to instruct the eNB to delay stopping scheduling the MBMS service. Further, the first notification for stopping scheduling of the MBMS service may further include stop delaying time length information or stop timestamp information, used to instruct the eNB to stop scheduling the MBMS service after a specified time is delayed.

For example, if the MCE determines to stop scheduling of the service 1, the MCE sends, to the eNB, a first notification for stopping scheduling of the service 1, where the notification may be used to indicate that scheduling of the service 1 is to be stopped, or the first notification may carry a stop delaying indication, to instruct the eNB to delay stopping scheduling the service 1, and according to the MBMS service stop delaying indication, the eNB continues to schedule the service for a period of time and then, stops scheduling the service. A stop delaying time may be further specified, used to indicate a relative time of a scheduling stop time relative to the received first notification for stopping scheduling, for example, 10 minutes, 5 minutes, two modification cycles, or another piece of time information, or timestamp information may be specified, for example, 12:30, 12:40, or another piece of specific timestamp information.

Optionally, the first notification for stopping scheduling of the MBMS service is carried by using MBMS scheduling information, and when the MBMS scheduling information no longer carries configuration information of the MBMS service, it indicates that scheduling of the MBMS service is to be stopped.

After controlling the receiver 43 to receive the first notification, of the MCE, for stopping scheduling of the MBMS service, the processor 41 further controls the transmitter 44 to send MBMS service scheduling stop information to the user equipment.

The processor 41 may control the transmitter 44 to send MBMS service scheduling stop information to the user equipment by using a point to multipoint control channel message not carrying configuration information of an MBMS service.

Optionally, the MBMS service scheduling stop information may carry a stop delaying indication, to notify the user equipment that stopping scheduling of the MBMS service will be delayed.

Optionally, at the same time when or after the processor 41 controls the transmitter 44 to notify the user equipment of the service scheduling stop information, the processor 41 controls the transmitter 44 to further send a stop delaying indication, to notify the user equipment that stopping scheduling of the MBMS will be delayed.

The MBMS service stop delaying indication may be sent to the user equipment by using any one of a point to multipoint control channel, a paging control channel, and MBMS transmission channel scheduling information. Specifically, if the MBMS service stop delaying indication is sent by using the point to multipoint control channel, the MBMS service stop delaying indication may be sent by using a counting request message carried on the point to multipoint control channel, for example, the MBMS service stop delaying indication is added to the counting request. If the MBMS service stop delaying indication is sent by using the MBMS transmission channel scheduling information, the MBMS service stop delaying indication may be represented by using a special value in an MBMS traffic channel stop position indication (MTCH stop) field in the MBMS transmission channel scheduling information.

The processor 41 continues to schedule the MBMS service, so that the user equipment that needs to continue to receive the MBMS service triggers establishment of a unicast bearer, and in a process of the unicast bearer, the MBMS service is not interrupted or an interruption time is reduced.

The processor 41 may stop scheduling the MBMS service when one of the following conditions is met: the receiver 43 receives a second notification, which is sent by the MCE, for stopping scheduling of the MBMS service, where the second notification for stopping scheduling of the MBMS service indicates that scheduling of the MBMS service is stopped; or after the receiver 43 receives the first notification for stopping scheduling of the MBMS service, a time point indicated by the first notification for stopping scheduling of the MBMS service arrives; or after the receiver 43 receives the first notification for stopping scheduling of the MBMS service, a first predetermined time passes; or after the first notification for stopping scheduling the service is received, a second predetermined time point arrives.

After receiving the MBMS service scheduling stop information of the eNB, the user equipment determines that an MBMS service is to be stopped, but continues to listen to the MSI for a period of time. If the user equipment needs to continue to receive the MBMS service, the user equipment may trigger establishment of the unicast bearer, and after the unicast bearer is established, stops receiving a point to multipoint traffic channel corresponding to the MBMS service.

The methods disclosed in the foregoing embodiments of the present invention may be applied to the processor 41 or implemented by the processor 41. In an implementation process, the steps of the foregoing methods can be completed by using an integrated logical circuit of hardware or an instruction in a software form in the processor 41. The methods, steps, and logical block diagrams disclosed in the embodiments of the present invention may be implemented or performed. With reference to the methods disclosed in the embodiments of the present invention, steps may be represented directly as being implemented by a hardware decoding processor, or implemented by a combination of hardware and software modules in a decoding processor. The software module may be located in a storage medium mature in the art, such as a random access memory, a flash memory, a read-only memory, a programmable read-only memory, an electrically erasable programmable memory, or a register. The storage medium is located in the memory 42, and the processor 41 reads information in the memory 42 and completes the steps of the foregoing methods in combination with hardware thereof.

Figure 11:
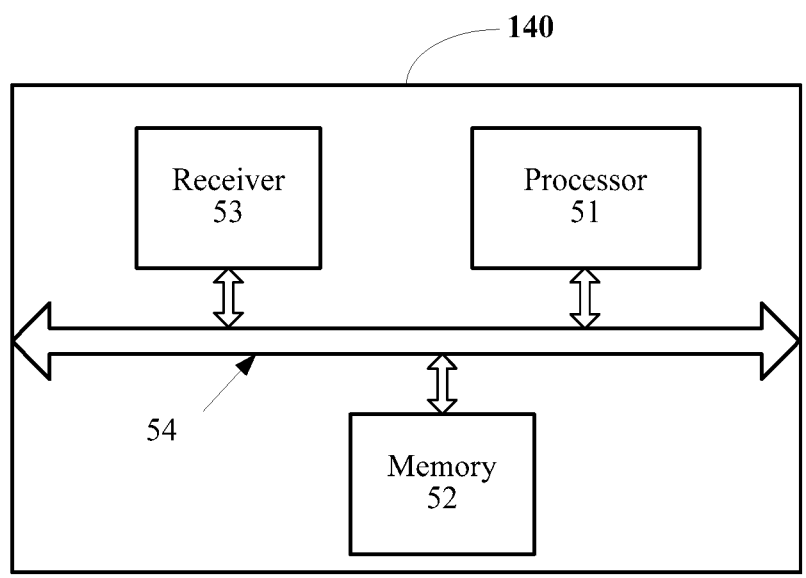
FIG. 11 is a schematic structural diagram of second user equipment according to an embodiment of the present invention.

Referring to FIG. 11, FIG. 11 is a schematic structural diagram of second user equipment according to an embodiment of the present invention. The user equipment 140 in this embodiment includes a processor 51, a memory 52, a receiver 53, and a bus system 54.

The processor 51 controls an operation of the user equipment 140, and the processor 51 may be further referred to as a CPU (Central Processing Unit). The processor 51 may be an integrated circuit chip and has a signal processing capability. The processor 51 may be a general purpose processor, a digital signal processor (DSP), an application-specific integrated circuit (ASIC), a field programmable gate array (FPGA), or another programmable logical device, discrete gate or transistor logical device, or discrete hardware component. The general purpose processor may be a microprocessor or the processor may be any conventional processor and the like.

The memory 52 may include a read-only memory and a random access memory, and provides an instruction and data to the processor 51. A part of the memory 52 may further include a non-volatile random access memory (NVRAM).

Components of the user equipment 140 are coupled together by using the bus system 55, and in addition to including a data bus, the bus system 55 further includes a power bus, a control bus, and a state signal bus. The bus system may be an ISA (Industry Standard Architecture) bus, a PCI (Peripheral Component Interconnect) bus, an EISA (Extended Industry Standard Architecture) bus, or the like. The bus may be one or more physical lines, and when the bus is multiple physical lines, the bus may be classified into an address bus, a data bus, a control bus, and the like. In some other embodiments of the present invention, the processor 51, the memory 52, and the receiver 53 may also be directly connected by using a communication line. However, for clear description, various buses are marked as the bus system 54 in the figure.

The memory 52 stores the following elements, executable modules or data structures, or a subset thereof, or an extension set thereof:

operation instructions: including various operation instructions, used to implement various operations; and an operating system: including various system programs, configured to implement various fundamental services and process a hardware-based task.

In this embodiment of the present invention, the processor 51 performs the following operations by invoking an operation instruction (the operation instruction may be stored in an operating system) stored in the memory 52:

the processor 51 is configured to control the receiver 53 to receive MBMS service scheduling stop information from a base station; determine that the base station will stop, when a predetermined condition is met, scheduling the MBMS service; continue to listen to scheduling information of the MBMS service; and control the receiver 53 to receive the MBMS service according to the scheduling information of the MBMS service that is listened to and obtained by the processor 51.

The memory 52 is configured to store the MBMS service data.

When determining to stop scheduling of an MBMS service, an MCE sends a scheduling stop notification to an eNB, and the eNB notifies user equipment of related information of the MBMS service whose scheduling is stopped, to notify the user equipment that when a predetermined condition is met, scheduling of the MBMS service will be stopped. The predetermined condition may be a predetermined time, a predetermined time point, or the like. Certainly, the predetermined condition may also be another condition.

After controlling the receiver 53 to receive the MBMS service scheduling stop information of the eNB, the processor 51 determines that scheduling of the MBMS service is to be stopped. The receiver 53 may receive a point to multipoint control channel message, and the processor 51 determines, according to that the message does not carry configuration information of an MBMS service, that scheduling of the MBMS service is to be stopped, or the point to multipoint control channel message still carries configuration information of an MBMS service, but the processor 52 determines, according to an indication carried in the MBMS service scheduling stop information and indicating that scheduling is to be stopped, that scheduling of the MBMS service is to be stopped.

After the receiver 53 receives an MBMS service scheduling stop notification, the processor 51 continues to listen to scheduling information of the MBMS service, where the scheduling information of the MBMS service may be specifically MBMS transmission channel scheduling information (MSI), and the user equipment continues to receive the MBMS service according to a sending position, which is indicated in the MSI, of the MBMS service.

Optionally, the MBMS service scheduling stop information carries a stop delaying indication, used to indicate, to the user equipment, that stopping scheduling of the MBMS service will be delayed, and the processor 51 continues to listen to the scheduling information of the MBMS service according to the stop delaying indication.

Optionally, at the same time when or after the user equipment receives the MBMS service scheduling stop information, the receiver 53 receives the MBMS service stop delaying indication from the eNB, and the processor 51 continues to listen to the scheduling information of the MBMS service according to the MBMS service stop delaying indication.

The receiver 53 may send, by using any one of a point to multipoint control channel, a paging control channel, and MBMS transmission channel scheduling information, the MBMS service stop delaying indication. Specifically, if the MBMS service stop delaying indication is received by using the point to multipoint control channel, the MBMS service stop delaying indication may be received by using a counting request message carried on the point to multipoint control channel, for example, the MBMS service stop delaying indication is carried in the counting request. If the MBMS service stop delaying indication is received by using the MBMS transmission channel scheduling information, the MBMS service stop delaying indication may be received by using a special value in an MBMS traffic channel stop position indication (MTCH stop) field in the MBMS transmission channel scheduling information.

The processor 51 further controls the receiver 53 to receive, according to the scheduling information of the MBMS service that is listened to and obtained by the processor 51, the MBMS service. Specifically, the scheduling information of the MBMS service is MBMS transmission channel scheduling information (MSI), and the receiving the MBMS service according to the scheduling information of the MBMS service includes: receiving the MBMS service according to a scheduling position, which is indicated in the MSI, of the MBMS service.

If the user equipment needs to continue to receive the MBMS service, the user equipment triggers establishment of a unicast bearer by using the processor 51, and in a process of establishing the unicast bearer, the processor 51 continues to listen to the scheduling information of the MBMS service. After the unicast bearer is established completely, the processor 51 controls the receiver 53 to stop receiving a point to multipoint traffic channel corresponding to the MBMS service, and continues to receive the MBMS service by using the unicast bearer.

Certainly, if the scheduling information of the MBMS service no longer includes information about the MBMS service, the receiver 53 is controlled to stop receiving the MBMS service.

The methods disclosed in the foregoing embodiments of the present invention may be applied to the processor 51 or implemented by the processor 51. In an implementation process, the steps of the foregoing methods can be completed by using an integrated logical circuit of hardware or an instruction in a software form in the processor 51. The methods, steps, and logical block diagrams disclosed in the embodiments of the present invention may be implemented or performed. With reference to the methods disclosed in the embodiments of the present invention, steps may be represented directly as being implemented by a hardware decoding processor, or implemented by a combination of hardware and software modules in a decoding processor. The software module may be located in a storage medium mature in the art, such as a random access memory, a flash memory, a read-only memory, a programmable read-only memory, an electrically erasable programmable memory, or a register. The storage medium is located in the memory 52, and the processor 51 reads information in the memory 52 and completes the steps of the foregoing methods in combination with hardware thereof.

Figure 12:
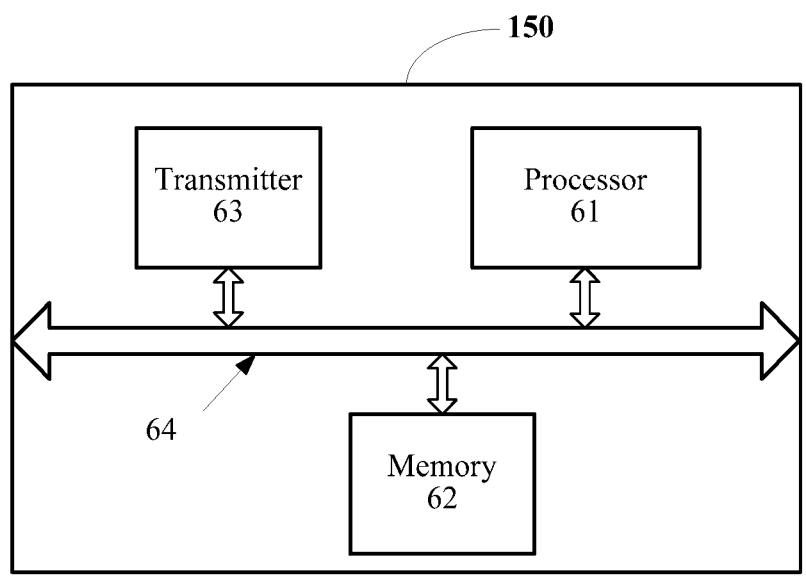
FIG. 12 is a schematic structural diagram of a second multi-cell/multicast coordination entity according to an embodiment of the present invention.

Referring to FIG. 12, FIG. 12 is a schematic structural diagram of a second multi-cell/multicast coordination entity according to an embodiment of the present invention. The multi-cell/multicast coordination entity 150 in this embodiment includes a processor 61, a memory 62, a transmitter 63, and a bus system 64.

The processor 61 controls an operation of the multi-cell/multicast coordination entity (MCE) 150, and the processor 61 may be further referred to as a CPU (Central Processing Unit). The processor 61 may be an integrated circuit chip and has a signal processing capability. The processor 61 may be a general purpose processor, a digital signal processor (DSP), an application-specific integrated circuit (ASIC), a field programmable gate array (FPGA), or another programmable logical device, discrete gate or transistor logical device, or discrete hardware component. The general purpose processor may be a microprocessor or the processor may be any conventional processor and the like.

The memory 62 may include a read-only memory and a random access memory, and provides an instruction and data to the processor 61. A part of the memory 62 may further include a non-volatile random access memory (NVRAM).

Components of the MCE 150 are coupled together by using the bus system 64, and in addition to including a data bus, the bus system 64 further includes a power bus, a control bus, and a state signal bus. The bus system may be an ISA (Industry Standard Architecture) bus, a PCI (Peripheral Component Interconnect) bus, an EISA (Extended Industry Standard Architecture) bus, or the like. The bus may be one or more physical lines, and when the bus is multiple physical lines, the bus may be classified into an address bus, a data bus, a control bus, and the like. In some other embodiments of the present invention, the processor 61, the memory 62, and the transmitter 63 may also be directly connected by using a communication line. However, for clear description, various buses are marked as the bus system 64 in the figure.

The memory 62 stores the following elements, executable modules or data structures, or a subset thereof, or an extension set thereof:

operation instructions: including various operation instructions, used to implement various operations; and an operating system: including various system programs, configured to implement various fundamental services and process a hardware-based task.

In this embodiment of the present invention, the processor 61 performs the following operations by invoking an operation instruction (the operation instruction may be stored in an operating system) stored in the memory 62:

the processor 61 is configured to determine an MBMS service that needs to be suspended; control the transmitter 63 to send an MBMS service scheduling stop notification to a base station, where the MBMS service scheduling stop notification notifies the base station that when a predetermined condition is met, scheduling of the MBMS service will be stopped; and the processor 61 instructs the base station to continue to schedule the MBMS service.

The memory 62 is configured to store the MBMS service data.

An MCE first triggers, by using the processor 61, an eNB to perform statistics on user equipments that receive an MBMS service, and determines, according to a statistical response of the eNB, a quantity of the user equipments of the MBMS service, and when the quantity of the user equipments that receive the MBMS service is less than a predetermined threshold, the processor 61 of the MCE determines to stop an MBSFN transmission manner of the MBMS service.

When determining that the MBMS service needs to be suspended, the processor 61 control the transmitter 63 to send the MBMS service scheduling stop notification to the base station, and the processor 61 instructs the base station to continue to schedule the MBMS service.

The processor 61 may update configuration information of the eNB by using MBMS scheduling information, where the updated configuration information no longer carries configuration information of the MBMS service that needs to be suspended, and is used as the MBMS service scheduling stop notification sent to the eNB.

The processor 61 controls the transmitter 63 to instruct the eNB to stop scheduling the MBMS service, where the quantity of the user equipments that receive the MBMS service is less than the predetermined threshold, for example, stop scheduling a service 1.

The MBMS service scheduling stop notification may further carry a stop delaying indication, to instruct the eNB to delay stopping scheduling the MBMS service. Further, the MBMS service scheduling stop notification may further include stop delaying time length information or stop timestamp information, used to instruct the eNB to stop scheduling the MBMS service after a specified time is delayed.

For example, if the MCE determines to stop scheduling of the service 1, the processor 61 controls the transmitter 63 to send, to the eNB, a notification for stopping scheduling of the service 1, where the notification may be used to indicate that scheduling of the service 1 is to be stopped, and according to the MBMS service stop delaying indication, the eNB continues to schedule the service for a period of time, and then, stop scheduling the service. Further, the notification may further carry a stop delaying indication, to instruct the eNB to delay stopping scheduling the service 1. A stop delaying time may be further specified, used to indicate a relative time of a scheduling stop time relative to a received first notification for stopping scheduling, for example, 10 minutes, 5 minutes, two modification cycles, or another piece of time information, or timestamp information may be specified, for example, 12:30, 12:40, or another piece of specific timestamp information.

Certainly, at the same time when or after the processor 61 controls the transmitter 63 to send the MBMS service scheduling stop notification, the processor 61 may also control the transmitter 63 to send a stop delaying indication, to instruct the eNB to delay stopping scheduling the MBMS service.

Another manner is that the processor 61 controls the transmitter 63 to first send, to the eNB, a first notification for stopping scheduling of the service 1, where the first notification indicates that scheduling of the service 1 is to be stopped, and then, controls the transmitter 63 to send a second notification for stopping scheduling of the service 1, where the second notification directly indicates that the eNB will stop scheduling the service 1 right now.

Optionally, the first notification for stopping scheduling of the MBMS service is carried by using MBMS scheduling information, and when the MBMS scheduling information no longer carries the MBMS service, it indicates that scheduling of the MBMS service is to be stopped.

The methods disclosed in the foregoing embodiments of the present invention may be applied to the processor 61 or implemented by the processor 61. In an implementation process, the steps of the foregoing methods can be completed by using an integrated logical circuit of hardware or an instruction in a software form in the processor 61. The methods, steps, and logical block diagrams disclosed in the embodiments of the present invention may be implemented or performed. With reference to the methods disclosed in the embodiments of the present invention, steps may be represented directly as being implemented by a hardware decoding processor, or implemented by a combination of hardware and software modules in a decoding processor. The software module may be located in a storage medium mature in the art, such as a random access memory, a flash memory, a read-only memory, a programmable read-only memory, an electrically erasable programmable memory, or a register. The storage medium is located in the memory 62, and the processor 61 reads information in the memory 62 and completes the steps of the foregoing methods in combination with hardware thereof.

In the foregoing embodiments of the base station, the user equipment, and the multi-cell/multicast coordination entity, an eNB receives an MBMS service scheduling stop notification sent by an MCE, and the eNB notifies user equipment of MBMS service scheduling stop information, and continues to schedule the MBMS service. In this way, an MCE determines to stop scheduling of an MBMS service, and user equipment that needs to continue to receive the MBMS service can also continue to receive the service in a process of establishing a unicast bearer, thereby effectively reducing a service interruption time in the process of establishing the unicast bearer because the user equipment needs to continue to receive the service after scheduling of the service is stopped, and providing better use experience to a user.

Figure 13:
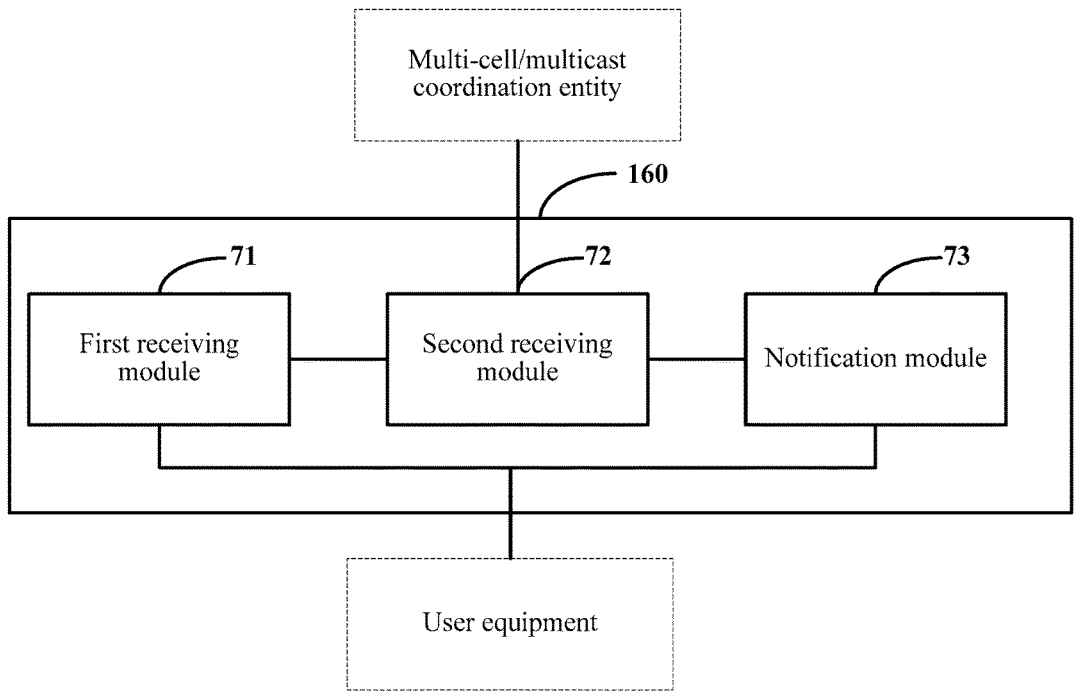
FIG. 13 is a schematic structural diagram of a first group communication server according to an embodiment of the present invention.

Referring to FIG. 13, FIG. 13 is a schematic structural diagram of a first group communication server according to an embodiment of the present invention. The group communication server 160 in this embodiment includes a first receiving module 71, a second receiving module 72, and a notification module 73.

The first receiving module 71 is configured to receive information that is reported by user equipment and that indicates that a group service is received by using an MBSFN.

In group communication, in an MBSFN area, data of a group service is carried in an MBMS service, a group communication server is configured to manage user equipment in a group, and before receiving the data of the group service, the user equipment first needs to register with the group communication server.

If the user equipment receives the group communication server in an MBSFN manner for communication, the user equipment may report, to the group communication server, information indicating that the user equipment is receiving the group service in the MBSFN manner, and information about the group service includes at least one of an MBSFN area identifier of the group service, and an identifier of a cell in which the group service is located. The group communication server receives, by using the first receiving module 71, information that is reported by the user equipment and that indicates that the group service is received by using an MBSFN.

The second receiving module 72 is configured to receive, from an MCE, a notification for stopping transmission of the MBSFN used to receive the group service.

If an MCE determines to stop scheduling of an MBMS service, before the MCE instructs an eNB to stop scheduling the MBMS service, the MCE first notifies the group communication server. The MCE may report, to the group communication server, information about a service that is to be stopped by the MCE, for example, an MBSFN area identifier, or an MBMS server identifier.

The group communication server receives, by using the second receiving module 72 from the MCE, a notification for stopping transmission of an MBSFN.

The notification module 73 is configured to instruct the user equipment to establish a unicast bearer, so that the user equipment continues to receive the group service by using the unicast bearer after the MBSFN used to receive the group service is stopped.

After the second receiving module 72 of the group communication server receives the notification indicating that transmission of the MBSFN is to be stopped, the notification module 73 instructs the user equipment to establish a unicast bearer, so that after the MBSFN used to receive the group service is stopped, the group service continues to be received by using the unicast bearer in replacement of the MBSFN. Preferably, the notification module 73 may instruct only the user equipment that needs to continue to receive the group service to establish a unicast bearer.

The user equipment that needs to continue to receive the group service triggers establishment of the unicast bearer according to the notification of the group communication server, so as to continue to receive the group service on the unicast bearer after transmission of the MBSFN is stopped. After the user equipment establishes the unicast bearer, the group communication server instructs the MCE to stop transmission of the MBSFN.

Specifically, if the user equipment receives group communication data by using the MBMS service, an access layer of the user equipment determines that an MBMS service is to be stopped, and sends an indication to a higher layer of the user equipment; the higher layer of the user equipment reports, to the group communication server, that a group service corresponding to the MBMS service cannot continue to be received in the MBSFN manner; after the group communication server receives the request, if the group communication server determines that the group service needs to continue to be sent to the user equipment, the group communication server triggers the user equipment to establish a unicast bearer to continue to receive the group service. The unicast bearer is a dedicated radio bearer, used to transmit the MBMS service, between the user equipment and the base station.

Before reporting, to the group communication server, that the group service corresponding to the MBMS service cannot continue to be received in the MBSFN manner, the higher layer of the user equipment needs to establish a connection to the eNB. In order to prevent network congestion caused when many user equipments simultaneously initiate a connection establishment process, after receiving MBMS service scheduling stop information of the eNB, the user equipment may perform random backoff, to prevent many user equipments from simultaneously triggering a unicast connection establishment process. Specifically, the user equipment generates a random factor to compare with a predetermined threshold, and determines, according to a comparison result, a delay for triggering a unicast establishment process. For example, a predetermined random factor is 0.5, a random number generated by a user is 0.6, and 0.6>0.5; therefore, the user triggers connection establishment after a delay of 10 ms.

The group communication server provided by this embodiment can implement the steps in the embodiment shown in FIG. 4, and division of functional modules of the group communication server in this embodiment is only exemplary, and under the premise that the objective of the present invention can be achieved, division of the functional modules of the group communication server is not limited to the foregoing manner, and may be another possible implementation manner. For example, multiple units or components may be combined or integrated into another system, or some features may be ignored or not performed.

Figure 14:
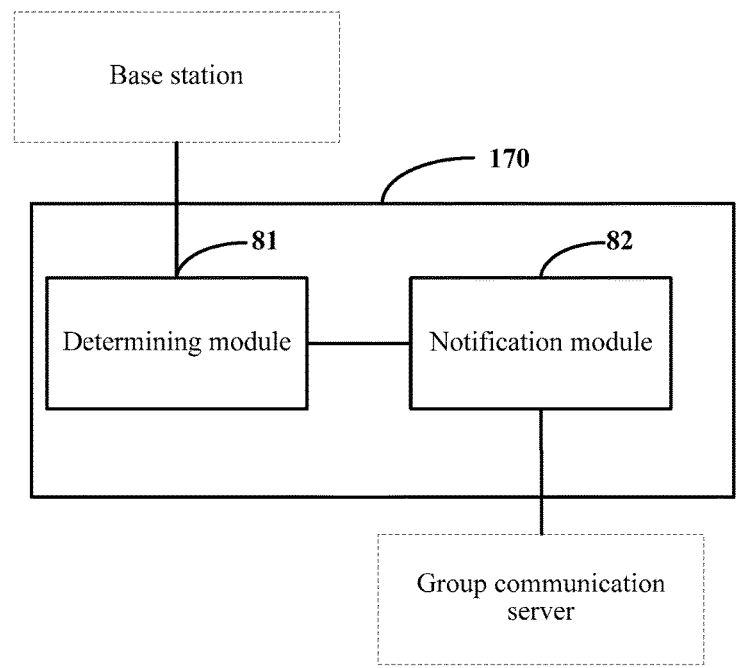
FIG. 14 is a schematic structural diagram of a third multi-cell/multicast coordination entity according to an embodiment of the present invention.

Referring to FIG. 14, FIG. 14 is a schematic structural diagram of a third multi-cell/multicast coordination entity according to an embodiment of the present invention. The multi-cell/multicast coordination entity 170 in this embodiment includes a determining module 81 and a notification module 82.

The determining module 81 is configured to determine transmission of an MBSFN that needs to be stopped.

The determining module 81 instructs a base station to perform statistics on user equipments that receive an MBMS service, determines, according to a statistical response of the base station, a quantity of the user equipments of the MBMS service, and when the quantity of the user equipments that receive the MBMS service is less than a predetermined threshold, that an MBSFN transmission manner of the MBMS service needs to be stopped.

The notification module 82 is configured to: after the determining module 81 determines that transmission of an MBSFN needs to be stopped, notify the group communication server that transmission of the MBSFN is stopped.

When the MCE determines to stop transmission of an MBSFN of an MBMS service, before the MCE instructs an eNB to stop scheduling the MBMS service, the MCE first notifies the group communication server by using the notification module 82. The MCE may report, to the group communication server, information about a service that is to be stopped by the MCE, for example, an MBSFN area identifier, or an MBMS server identifier. Therefore, the group communication server instructs user equipment to establish a unicast bearer, so that the user equipment continues to receive a group service by using the unicast bearer in replacement of the MBSFN after transmission of the MBSFN is stopped.

After the group communication server is notified that transmission of the MBSFN is to be stopped, after a predetermined period of time, MBMS service scheduling stop information is sent to the eNB, so that the eNB stops scheduling the MBMS service.

The group communication server is configured to manage user equipment in a group of the group communication server, and after receiving a notification indicating that transmission of the MBSFN is to be stopped, the group communication server may instruct the user equipment to establish the unicast bearer, so that after transmission of the MBSFN that receives the group service is stopped, the group service can also continue to be received by using the unicast bearer.

The multi-cell/multicast coordination entity provided by this embodiment can implement the steps in the embodiment shown in FIG. 5, and division of functional modules of the multi-cell/multicast coordination entity in this embodiment is only exemplary, and under the premise that the objective of the present invention can be achieved, division of the functional modules of the multi-cell/multicast coordination entity is not limited to the foregoing manner, and may be another possible implementation manner. For example, multiple units or components may be combined or integrated into another system, or some features may be ignored or not performed.

Figure 15:
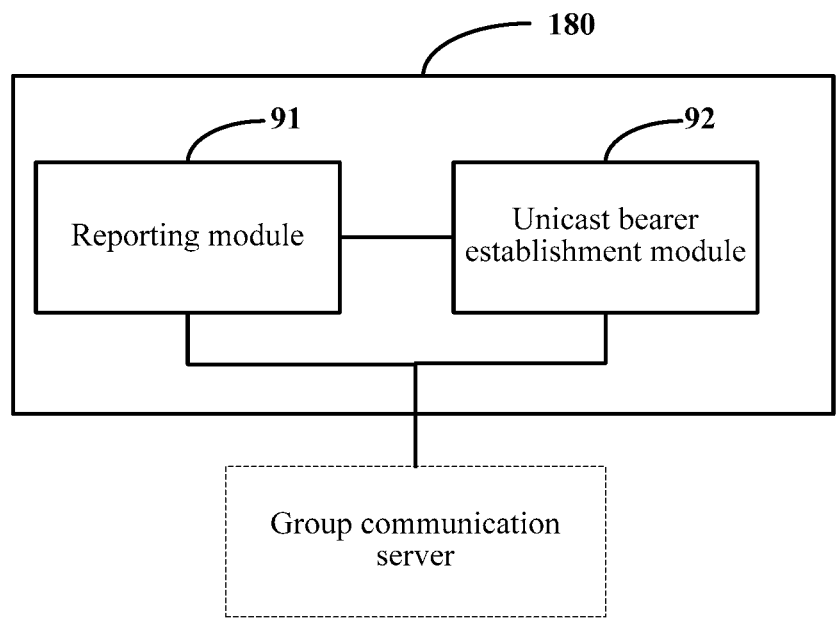
FIG. 15 is a schematic structural diagram of third user equipment according to an embodiment of the present invention.

Referring to FIG. 15, FIG. 15 is a schematic structural diagram of third user equipment according to an embodiment of the present invention. The user equipment 180 in this embodiment includes a reporting module 91 and a unicast bearer establishment module 92.

The reporting module 91 is configured to report, to a group communication server, information indicating that a group service is received by using an MBSFN.

In group communication, in an MBSFN area, data of a group service is carried in an MBMS service, a group communication server is configured to manage user equipment in a group, and before receiving the data of the group service, the user equipment first needs to register with the group communication server. Therefore, the reporting module 91 is further configured to register with the group communication server in advance.

If the user equipment receives the group service in an MBSFN manner, the user equipment may report, by using the reporting module 91 to the group communication server, information indicating that the user equipment is receiving the group service in the MBSFN manner, and information about the group service includes at least one of an MBSFN area identifier of the group service, and an identifier of a cell in which the group service is located.

The unicast bearer establishment module 92 is configured to establish a unicast bearer according to a unicast bearer establishment notification of the group communication server, and continue to listen to scheduling information of the carried group service.

If an MCE determines to stop scheduling of an MBMS service, before the MCE instructs an eNB to stop scheduling the MBMS service, the MCE first notifies the group communication server. The MCE may report, to the group communication server, information about a service that is to be stopped by the MCE, for example, an MBSFN area identifier, or an MBMS server identifier.

The group communication server receives, from the MCE, a notification indicating that transmission of an MBSFN is to be stopped.

After receiving the notification indicating that transmission of the MBSFN is to be stopped, the group communication server instructs the user equipment to establish a unicast bearer, so as to continue to receive the group service by using the unicast bearer. Preferably, only the user equipment that needs to continue to receive the group service may be instructed to establish a unicast bearer.

The unicast bearer establishment module 92 of the user equipment that needs to continue to receive the group service triggers establishment of the unicast bearer according to the notification of the group communication server, so as to continue to receive the group service on the unicast bearer after transmission of the MBSFN is stopped. After the user equipment establishes the unicast bearer, the group communication server instructs the MCE to stop transmission of the MBSFN.

In a process of establishing the unicast bearer, the user equipment continues to listen to scheduling information of the carried group service, and after the unicast bearer is established completely, the user equipment stops listening to the scheduling information of the carried group service, and continues to receive the group service by using the unicast bearer.

The user equipment provided by this embodiment can implement the steps in the embodiment shown in FIG. 6, and division of functional modules of the user equipment in this embodiment is only exemplary, and under the premise that the objective of the present invention can be achieved, division of the functional modules of the user equipment is not limited to the foregoing manner, and may be another possible implementation manner. For example, multiple units or components may be combined or integrated into another system, or some features may be ignored or not performed.

Figure 16:
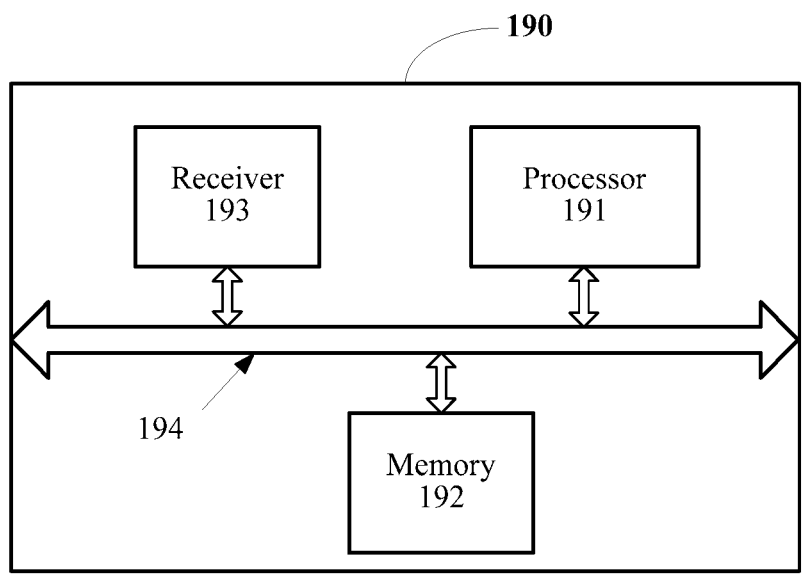
FIG. 16 is a schematic structural diagram of a second group communication server according to an embodiment of the present invention.

Referring to FIG. 16, FIG. 16 is a schematic structural diagram of a second group communication server according to an embodiment of the present invention. The group communication server 190 in this embodiment includes a processor 191, a receiver 193, a memory 192, and a bus system 194.

The processor 191 controls an operation of the group communication server 190, and the processor 191 may be further referred to as a CPU (Central Processing Unit). The processor 191 may be an integrated circuit chip and has a signal processing capability. The processor 191 may be a general purpose processor, a digital signal processor (DSP), an application-specific integrated circuit (ASIC), a field programmable gate array (FPGA), or another programmable logical device, discrete gate or transistor logical device, or discrete hardware component. The general purpose processor may be a microprocessor or the processor may be any conventional processor and the like.

The memory 192 may include a read-only memory and a random access memory, and provides an instruction and data to the processor 191. A part of the memory 192 may further include a non-volatile random access memory (NVRAM).

Components of the group communication server 190 are coupled together by using the bus system 194, and in addition to including a data bus, the bus system 194 further includes a power bus, a control bus, and a state signal bus. The bus system may be an ISA (Industry Standard Architecture) bus, a PCI (Peripheral Component Interconnect) bus, an EISA (Extended Industry Standard Architecture) bus, or the like. The bus may be one or more physical lines, and when the bus is multiple physical lines, the bus may be classified into an address bus, a data bus, a control bus, and the like. In some other embodiments of the present invention, the processor 191, the memory 192, and the receiver 193 may also be directly connected by using a communication line. However, for clear description, various buses are marked as the bus system 194 in the figure.

The memory 192 stores the following elements, executable modules or data structures, or a subset thereof, or an extension set thereof:

operation instructions: including various operation instructions, used to implement various operations; and an operating system: including various system programs, configured to implement various fundamental services and process a hardware-based task.

In this embodiment of the present invention, the processor 191 performs the following operations by invoking an operation instruction (the operation instruction may be stored in an operating system) stored in the memory 192:

the processor 191 is configured to control the receiver 193 to receive information that is reported by user equipment and that indicates that a group service is received by using an MBSFN, and control the receiver 193 to receive, from the MCE, a notification for stopping transmission of an MBSFN, and instruct the user equipment to establish a unicast bearer, so that the user equipment continues to receive a group service by using the unicast bearer.

The memory 192 is configured to store group service data.

In group communication, in an MBSFN area, data of a group service is carried in an MBMS service, a group communication server is configured to manage user equipment in a group, and before receiving the data of the group service, the user equipment first needs to register with the group communication server.

If the user equipment receives the group communication server in an MBSFN manner for communication, the user equipment may report, to the group communication server, information indicating that the user equipment is receiving the group service in the MBSFN manner, and information about the group service includes at least one of an MBSFN area identifier of the group service, and an identifier of a cell in which the group service is located. The group communication server receives, by using the first receiving module 71, information that is reported by the user equipment and that indicates that the group service is received by using an MBSFN.

If an MCE determines to stop scheduling of an MBMS service, before the MCE instructs an eNB to stop scheduling the MBMS service, the MCE first notifies the group communication server. The MCE may report, to the group communication server, information about a service that is to be stopped by the MCE, for example, an MBSFN area identifier, or an MBMS server identifier.

The processor 191 of the group communication server controls the receiver 193 to receive, from the MCE, a notification indicating that transmission of an MBSFN is to be stopped. After the receiver 193 receives the notification indicating that transmission of the MBSFN is to be stopped, the processor 191 instructs the user equipment to establish a unicast bearer, so as to continue to receive the group service by using the unicast bearer. Preferably, the processor 191 may instruct only the user equipment that needs to continue to receive the group service to establish a unicast bearer.

The user equipment that needs to continue to receive the group service triggers establishment of the unicast bearer according to the notification of the group communication server, so as to continue to receive the group service on the unicast bearer after transmission of the MBSFN is stopped. After the user equipment establishes the unicast bearer, the group communication server instructs the MCE to stop transmission of the MBSFN.

Specifically, if the user equipment receives group communication data by using the MBMS service, an access layer of the user equipment determines that an MBMS service is to be stopped, and sends an indication to a higher layer of the user equipment; the higher layer of the user equipment reports, to the group communication server, that a group service corresponding to the MBMS service cannot continue to be received in the MBSFN manner; after the group communication server receives the request, if the group communication server determines that the group service needs to continue to be sent to the user equipment, the group communication server triggers the user equipment to establish a unicast bearer to continue to receive the group service. The unicast bearer is a dedicated radio bearer, used to transmit the MBMS service, between the user equipment and the base station.

Before reporting, to the group communication server, that the group service corresponding to the MBMS service cannot continue to be received in the MBSFN manner, the higher layer of the user equipment needs to establish a connection to the eNB. In order to prevent network congestion caused when many user equipments simultaneously initiate a connection establishment process, after receiving MBMS service scheduling stop information of the eNB, the user equipment may perform random backoff, to prevent many user equipments from simultaneously triggering a unicast connection establishment process. Specifically, the user equipment generates a random factor to compare with a predetermined threshold, and determines, according to a comparison result, a delay for triggering a unicast establishment process. For example, a predetermined random factor is 0.5, a random number generated by a user is 0.6, and 0.6>0.5; therefore, the user triggers connection establishment after a delay of 10 ms.

The methods disclosed in the foregoing embodiments of the present invention may be applied to the processor 191 or implemented by the processor 191. In an implementation process, the steps of the foregoing methods can be completed by using an integrated logical circuit of hardware or an instruction in a software form in the processor 191. The methods, steps, and logical block diagrams disclosed in the embodiments of the present invention may be implemented or performed. With reference to the methods disclosed in the embodiments of the present invention, steps may be represented directly as being implemented by a hardware decoding processor, or implemented by a combination of hardware and software modules in a decoding processor. The software module may be located in a storage medium mature in the art, such as a random access memory, a flash memory, a read-only memory, a programmable read-only memory, an electrically erasable programmable memory, or a register. The storage medium is located in the memory 192, and the processor 191 reads information in the memory 192 and completes the steps of the foregoing methods in combination with hardware thereof.

Figure 17:
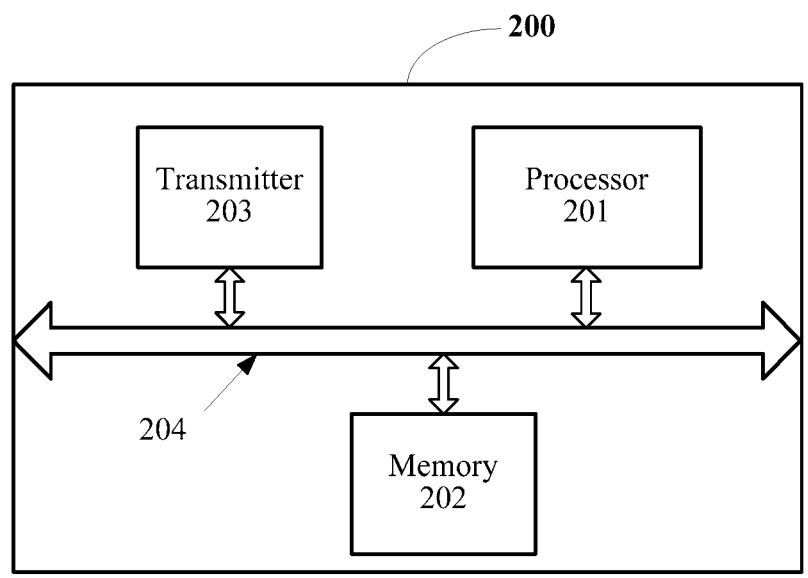
FIG. 17 is a schematic structural diagram of a fourth multi-cell/multicast coordination entity according to an embodiment of the present invention.

Referring to FIG. 17, FIG. 17 is a schematic structural diagram of a fourth multi-cell/multicast coordination entity according to an embodiment of the present invention. The multi-cell/multicast coordination entity 200 in this embodiment includes a processor 201, a memory 202, a transmitter 203, and a bus system 204.

The processor 201 controls an operation of the multi-cell/multicast coordination entity 200, and the processor 201 may be further referred to as a CPU (Central Processing Unit). The processor 201 may be an integrated circuit chip and has a signal processing capability. The processor 201 may be a general purpose processor, a digital signal processor (DSP), an application-specific integrated circuit (ASIC), a field programmable gate array (FPGA), or another programmable logical device, discrete gate or transistor logical device, or discrete hardware component. The general purpose processor may be a microprocessor or the processor may be any conventional processor and the like.

The memory 202 may include a read-only memory and a random access memory, and provides an instruction and data to the processor 201. A part of the memory 202 may further include a non-volatile random access memory (NVRAM).

Components of the multi-cell/multicast coordination entity 200 are coupled together by using a bus system 204, and in addition to including a data bus, the bus system 204 further includes a power bus, a control bus, and a state signal bus. The bus system may be an ISA (Industry Standard Architecture) bus, a PCI (Peripheral Component Interconnect) bus, an EISA (Extended Industry Standard Architecture) bus, or the like. The bus may be one or more physical lines, and when the bus is multiple physical lines, the bus may be classified into an address bus, a data bus, a control bus, and the like. In some other embodiments of the present invention, the processor 201, the memory 202, and the transmitter 203 may also be directly connected by using a communication line. However, for clear description, various buses are marked as the bus system 204 in the figure.

The memory 202 stores the following elements, executable modules or data structures, or a subset thereof, or an extension set thereof:

operation instructions: including various operation instructions, used to implement various operations; and an operating system: including various system programs, configured to implement various fundamental services and process a hardware-based task.

In this embodiment of the present invention, the processor 201 performs the following operations by invoking an operation instruction (the operation instruction may be stored in an operating system) stored in the memory 202:

the processor 201 is configured to determine an MBMS service that needs to be suspended; control the transmitter 203 to send an MBMS service scheduling stop notification to a base station, where the MBMS service scheduling stop notification indicates that scheduling of an MBMS service is to be stopped; and the processor 201 instructs the base station to continue to schedule the MBMS service.

The memory 202 is configured to store MBMS service data.

The processor 201 instructs a base station to perform statistics on user equipments that receive an MBMS service, determines, according to a statistical response of the base station, a quantity of the user equipments of the MBMS service, and when the quantity of the user equipments that receive the MBMS service is less than a predetermined threshold, that an MBSFN transmission manner of the MBMS service needs to be stopped.

When the MCE determines to stop transmission of an MBSFN of an MBMS service, before the MCE instructs an eNB to stop scheduling the MBMS service, the processor 201 controls the transmitter 203 to first notify the group communication server. The transmitter 203 may report, to the group communication server, information about a service that is to be stopped by the MCE, for example, an MBSFN area identifier, or an MBMS server identifier. Therefore, the group communication server instructs user equipment to establish a unicast bearer, so that the user equipment continues to receive a group service by using the unicast bearer in replacement of the MBSFN after transmission of the MBSFN is stopped.

After the group communication server is notified that transmission of the MBSFN is to be stopped, after a predetermined period of time, MBMS service scheduling stop information is sent to the eNB, so that the eNB stops scheduling the MBMS service.

The group communication server is configured to manage user equipment in a group of the group communication server, and after receiving a notification indicating that transmission of the MBSFN is to be stopped, the group communication server may instruct the user equipment to establish the unicast bearer, so that after transmission of the MBSFN that receives the group service is stopped, the group service can also continue to be received by using the unicast bearer.

The methods disclosed in the foregoing embodiments of the present invention may be applied to the processor 201 or implemented by the processor 201. In an implementation process, the steps of the foregoing methods can be completed by using an integrated logical circuit of hardware or an instruction in a software form in the processor 201. The methods, steps, and logical block diagrams disclosed in the embodiments of the present invention may be implemented or performed. With reference to the methods disclosed in the embodiments of the present invention, steps may be represented directly as being implemented by a hardware decoding processor, or implemented by a combination of hardware and software modules in a decoding processor. The software module may be located in a storage medium mature in the art, such as a random access memory, a flash memory, a read-only memory, a programmable read-only memory, an electrically erasable programmable memory, or a register. The storage medium is located in the memory 202, and the processor 201 reads information in the memory 202 and completes the steps of the foregoing methods in combination with hardware thereof.

Figure 18:
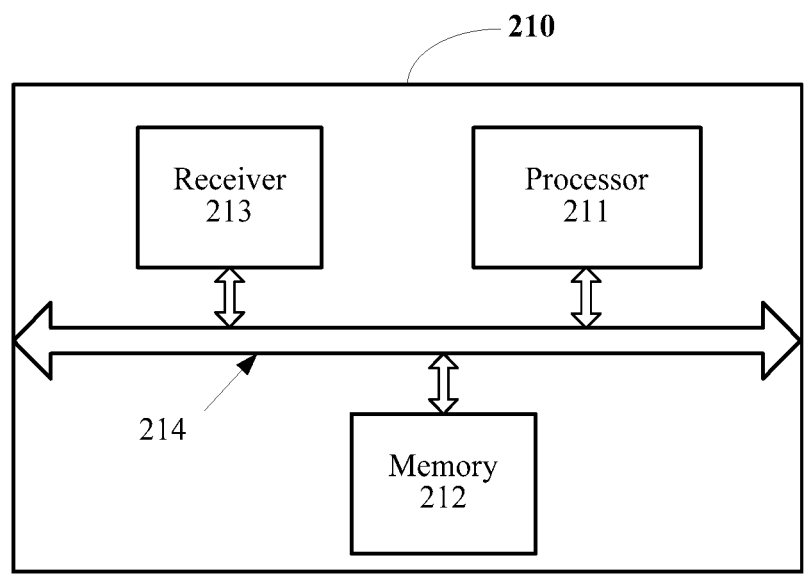
FIG. 18 is a schematic structural diagram of fourth user equipment according to an embodiment of the present invention.

Referring to FIG. 18, FIG. 18 is a schematic structural diagram of fourth user equipment according to an embodiment of the present invention. The user equipment 210 in this embodiment includes a processor 211, a memory 212, a receiver 213, and a bus system 214.

The processor 211 controls an operation of the user equipment 210, and the processor 211 may be further referred to as a CPU (Central Processing Unit). The processor 211 may be an integrated circuit chip and has a signal processing capability. The processor 211 may be a general purpose processor, a digital signal processor (DSP), an application-specific integrated circuit (ASIC), a field programmable gate array (FPGA), or another programmable logical device, discrete gate or transistor logical device, or discrete hardware component. The general purpose processor may be a microprocessor or the processor may be any conventional processor and the like.

The memory 212 may include a read-only memory and a random access memory, and provides an instruction and data to the processor 211. A part of the memory 212 may further include a non-volatile random access memory (NVRAM).

Components of the user equipment 210 are coupled together by using the bus system 214, and in addition to including a data bus, the bus system 214 further includes a power bus, a control bus, and a state signal bus. The bus system may be an ISA (Industry Standard Architecture) bus, a PCI (Peripheral Component Interconnect) bus, an EISA (Extended Industry Standard Architecture) bus, or the like. The bus may be one or more physical lines, and when the bus is multiple physical lines, the bus may be classified into an address bus, a data bus, a control bus, and the like. In some other embodiments of the present invention, the processor 211, the memory 212, and the receiver 213 may also be directly connected by using a communication line. However, for clear description, various buses are marked as the bus system 214 in the figure.

The memory 212 stores the following elements, executable modules or data structures, or a subset thereof, or an extension set thereof:

operation instructions: including various operation instructions, used to implement various operations; and an operating system: including various system programs, configured to implement various fundamental services and process a hardware-based task.

In this embodiment of the present invention, the processor 211 performs the following operations by invoking an operation instruction (the operation instruction may be stored in an operating system) stored in the memory 212:

the processor 211 is configured to report, to a group communication server, information indicating that a group service is received by using an MBSFN; control the receiver 213 to receive a notification of the group communication server; and according to the notification of the group communication server, when a group service needs to continue to be received, establish a unicast bearer, and continue to listen to scheduling information of the carried group service.

The memory 212 is configured to store data.

In group communication, in an MBSFN area, data of a group service is carried in an MBMS service, a group communication server is configured to manage user equipment in a group, and before receiving the data of the group service, the user equipment first needs to register with the group communication server.

If the user equipment receives the group service in an MBSFN manner, the processor 211 reports, to the group communication server, information indicating that the user equipment is receiving the group service in the MBSFN manner, and information about the group service includes at least one of an MBSFN area identifier of the group service, and an identifier of a cell in which the group service is located.

If an MCE determines to stop scheduling of an MBMS service, before the MCE instructs an eNB to stop scheduling the MBMS service, the MCE first notifies the group communication server. The MCE may report, to the group communication server, information about a service that is to be stopped by the MCE, for example, an MBSFN area identifier, or an MBMS server identifier.

The group communication server receives, from the MCE, a notification indicating that transmission of an MBSFN is to be stopped.

After receiving the notification indicating that transmission of the MBSFN is to be stopped, the group communication server instructs the user equipment to establish a unicast bearer, so as to continue to receive the group service by using the unicast bearer. Preferably, only the user equipment that needs to continue to receive the group service may be instructed to establish a unicast bearer.

The processor 211 of the user equipment that needs to continue to receive the group service triggers establishment of the unicast bearer according to the notification of the group communication server, so as to continue to receive the group service on the unicast bearer after transmission of the MBSFN is stopped. After the user equipment establishes the unicast bearer, the group communication server instructs the MCE to stop transmission of the MBSFN.

In a process of establishing the unicast bearer, the processor 211 continues to listen to scheduling information of the carried group service, and after the unicast bearer is established completely, the processor 211 stops listening to the scheduling information of the carried group service, and continues to receive the group service by using the unicast bearer.

The methods disclosed in the foregoing embodiments of the present invention may be applied to the processor 211 or implemented by the processor 211. In an implementation process, the steps of the foregoing methods can be completed by using an integrated logical circuit of hardware or an instruction in a software form in the processor 211. The methods, steps, and logical block diagrams disclosed in the embodiments of the present invention may be implemented or performed. With reference to the methods disclosed in the embodiments of the present invention, steps may be represented directly as being implemented by a hardware decoding processor, or implemented by a combination of hardware and software modules in a decoding processor. The software module may be located in a storage medium mature in the art, such as a random access memory, a flash memory, a read-only memory, a programmable read-only memory, an electrically erasable programmable memory, or a register. The storage medium is located in the memory 212, and the processor 211 reads information in the memory 212 and completes the steps of the foregoing methods in combination with hardware thereof.

Through detailed descriptions of the foregoing embodiments of the group communication server, the user equipment, and the multi-cell/multicast coordination entity, it may be understood that, in the embodiments of the present invention, when an MCE determines to stop transmission of an MBSFN that needs to be stopped, before the MCE notifies an eNB, the MCE first notifies a group communication server that manages user equipment in a group; and the group communication server instructs the user equipment to establish a unicast bearer, and after the user equipment establishes the unicast bearer, instructs the MCE to stop transmission of the MBSFN. In this way, when an MCE determines to stop transmission of an MBSFN, user equipment that needs to continue to receive a group service by using the MBSFN first establishes a unicast bearer according to a notification of a group communication server, thereby preventing the group service from being interrupted, and providing better use experience to a user.

Through the descriptions of the foregoing embodiments, it may be understood that, after an MCE determines to stop scheduling a service, UE that needs to continue to receive the service needs to establish the unicast bearer, and the present invention aims to how to reduce a service interruption time caused in a process of establishing the unicast bearer.

According to the method and the device for maintaining service continuity that are provided by the embodiments of the present invention, a base station receives an MBMS service scheduling stop notification sent by an MCE, and the base station notifies user equipment of MBMS service scheduling stop information, and continues to schedule the MBMS service. In this way, an MCE determines to stop scheduling of an MBMS service, and user equipment that needs to continue to receive the MBMS service can also continue to receive the service in a process of establishing a unicast bearer, thereby effectively reducing a service interruption time in the process of establishing the unicast bearer because the user equipment needs to continue to receive the service after scheduling of the service is stopped, and providing better use experience to a user.

According to another aspect, embodiments of the present invention further provide a method and device for maintaining service continuity, where when an MCE determines to stop transmission of an MBSFN that needs to be stopped, before the MCE notifies an eNB, the MCE first notifies a group communication server that manages user equipment in a group; and the group communication server instructs the user equipment to establish a unicast bearer, and after the user equipment establishes the unicast bearer, instructs the MCE to stop transmission of the MBSFN. In this way, when an MCE determines to stop transmission of an MBSFN, user equipment that needs to continue to receive a group service by using the MBSFN first establishes a unicast bearer according to a notification of a group communication server, thereby preventing the group service from being interrupted, and providing better use experience to a user.

In the several embodiments provided by this application, it should be understood that the disclosed system, apparatus, and method may be implemented in other manners. For example, the described apparatus embodiment is merely exemplary. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a multi-cell/multicast coordination entity) or a processor (processor) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely embodiments of this application, and are not intended to limit the scope of this application. An equivalent structural or equivalent process alternation made by using the content of the specification and drawings of this application, or an application of the content of the specification and drawings directly or indirectly to another related technical field, shall fall within the protection scope of this application.

What is claimed is:

1. A method for maintaining service continuity, wherein the method comprises:
   receiving, by a base station, a first notification from a multi-cell/multicast coordination entity for stopping scheduling of a multimedia broadcast multicast service (MBMS) service;
   sending, by the base station, MBMS service scheduling stop information to user equipment according to the first notification, wherein the MBMS service scheduling stop information carries an indication that scheduling of the MBMS service is to be stopped, so as to notify the user equipment that scheduling of the MBMS service is to be stopped; and
   continuing, by the base station, to schedule the MBMS service until a predetermined condition is met, and then, in response to the predetermined condition being met, stopping scheduling of the MBMS service.

2. The method according to claim 1, wherein the first notification carries a stop delaying indication, to instruct the base station to delay stopping scheduling of the MBMS service.

3. The method according to claim 2, wherein the first notification comprises stop delaying time length information or predetermined stop timestamp information.

4. The method according to claim 1, wherein the first notification carries an indication of a time point, and the predetermined condition comprises:
   after the first notification is received, arriving at the time point indicated by the first notification.

5. The method according to claim 1, wherein the base station sends, by using any one of a point to multipoint control channel, a paging control channel, and MBMS transmission channel scheduling information, the indication indicating that scheduling of the MBMS service is to be stopped.

6. The method according to claim 1, wherein the indication indicating that scheduling of the MBMS service is to be stopped is received by using any one of a point to multipoint control channel, a paging control channel, and MBMS transmission channel scheduling information.

7. A method for maintaining service continuity, wherein the method comprises:
   receiving, by user equipment, multimedia broadcast multicast service (MBMS) service scheduling stop information from a base station, wherein the MBMS service scheduling stop information carries an indication that scheduling of the MBMS service is to be stopped, and determining that the base station is to stop scheduling the MBMS service;
   continuing, by the user equipment, to listen for scheduling information of the MBMS service; and
   receiving, by the user equipment, the MBMS service according to the scheduling information of the MBMS service.

8. A base station comprising:
   a non-transitory, computer-readable medium having processor-executable instructions stored thereon for maintaining service continuity; and
   a processor, configured to executed the processor-executable instructions to facilitate:
      receiving a first notification from a multi-cell/multicast coordination entity for stopping scheduling of a multimedia broadcast multicast service (MBMS) service;
      sending MBMS service scheduling stop information to user equipment according to the first notification, wherein the MBMS service scheduling stop information carries an indication that scheduling of the MBMS service is to be stopped, so as to notify the user equipment that scheduling of the MBMS service is to be stopped; and
      continuing to schedule the MBMS service until a predetermined condition is met, and then, in response to the predetermined condition being met, stopping scheduling of the MBMS service.

9. The base station according to claim 8, wherein the first notification carries a stop delaying indication, to instruct the base station to delay stopping scheduling of the MBMS service.

10. The base station according to claim 9, wherein the first notification comprises stop delaying time length information or predetermined stop timestamp information.

11. The base station according to claim 8, wherein the first notification carries an indication of a time point, and the predetermined condition comprises:
   after the first notification is received, arriving at a time point indicated by the first notification.

12. The base station according to claim 8, wherein the base station is configured to send, by using any one of a point to multipoint control channel, a paging control channel, and MBMS transmission channel scheduling information, the indication indicating that scheduling of the MBMS service is to be stopped.

13. A user equipment comprising:
   a non-transitory, computer-readable medium having processor-executable instructions stored thereon for maintaining service continuity; and
   a processor configured to executed the processor-executable instructions to facilitate:
      receiving multimedia broadcast multicast service (MBMS) service scheduling stop information from a base station wherein the MBMS service scheduling stop information carries an indication that scheduling of the MBMS service is to be stopped, and determining that the base station is to stop scheduling the MBMS service;
      continuing to listen for scheduling information of the MBMS service; and receiving the MBMS service according to the scheduling information of the MBMS service.

14. The user equipment according to claim 13, wherein the indication indicating that scheduling of the MBMS service is to be stopped is received by using any one of a point to multipoint control channel, a paging control channel, and MBMS transmission channel scheduling information.

* * * * *